US010054373B2

(12) United States Patent
Frazier et al.

(10) Patent No.: US 10,054,373 B2
(45) Date of Patent: Aug. 21, 2018

(54) CONCRETE AND TUBE HOT THERMAL EXCHANGE AND ENERGY STORE (TXES) INCLUDING TEMPERATURE GRADIENT CONTROL TECHNIQUES

(71) Applicant: Bright Energy Storage Technologies, LLP, Arvada, CO (US)

(72) Inventors: Scott Raymond Frazier, Morrison, CO (US); Jennifer Fon Tuey, Superior, CO (US); Miles L. Abarr, Boulder, CO (US); Brendan R. Geels, Golden, CO (US); Karl Ginter, Beltsville, MD (US); Alex Lau, Arvada, CO (US)

(73) Assignee: Bright Energy Storage Technolgies, LLP, Arvada, CO (US)

( * ) Notice: Subject to any disclaimer, the term of this patent is extended or adjusted under 35 U.S.C. 154(b) by 6 days.

(21) Appl. No.: 14/919,535

(22) Filed: Oct. 21, 2015

(65) Prior Publication Data
US 2016/0108761 A1    Apr. 21, 2016

Related U.S. Application Data

(60) Provisional application No. 62/066,773, filed on Oct. 21, 2014, provisional application No. 62/220,796, filed on Sep. 18, 2015.

(51) Int. Cl.
*F28D 20/00* (2006.01)
*F28D 20/02* (2006.01)
(Continued)

(52) U.S. Cl.
CPC ....... *F28D 20/0056* (2013.01); *F28D 20/026* (2013.01); *F01K 7/16* (2013.01);
(Continued)

(58) Field of Classification Search
CPC ......... F28D 20/0056; F28D 2020/0069; F28D 2020/0013; F28D 2020/0078; F28D 20/026
(Continued)

(56) References Cited

U.S. PATENT DOCUMENTS 3,493,042 A * 2/1970 Burne ................... F28D 7/0041
                                                    165/180
4,037,567 A   7/1977 Torres
(Continued)

FOREIGN PATENT DOCUMENTS

EP    2775245 A1 *  9/2014

OTHER PUBLICATIONS

"Waste Heat Recovery: Technology and Opportunities in U.S. Industry," BCS, Incorporated, U.S. Department of Energy, Industrial Technologies Program, Mar. 2008.
(Continued)

*Primary Examiner* — Devon Russell
(74) *Attorney, Agent, or Firm* — Ziolkowski Patent Solutions Group, SC

(57) ABSTRACT

A thermal heat capture, storage, and exchange arrangement, includes at least one thermal exchange and storage (TXES) array, with each TXES array including one or more TXES elements that receive a fluid flow of a heat source fluid and a working fluid, with the TXES elements providing for a transfer of thermal energy between the heat source fluid and the TXES elements. A manifold system provides the working fluid to an input of the TXES elements and receives the working fluid from an output of the TXES elements. At least one heat engine operable with the TXES array extracts heat from the TXES array and converts it to mechanical energy, with the heat engine being selectively connected to the manifold system of a TXES array to pass the working fluid
(Continued)

through the TXES elements, such that a transfer of thermal energy between the working fluid and the TXES elements occurs.

18 Claims, 14 Drawing Sheets

(51) Int. Cl.
  *F01K 7/16* (2006.01)
  *F01K 13/02* (2006.01)
  *F01K 25/06* (2006.01)
(52) U.S. Cl.
  CPC .............. *F01K 13/02* (2013.01); *F01K 25/06* (2013.01); *F28D 2020/0013* (2013.01); *F28D 2020/0069* (2013.01); *F28D 2020/0078* (2013.01)
(58) Field of Classification Search
  USPC .......................................................... 165/10
  See application file for complete search history.

(56) References Cited

U.S. PATENT DOCUMENTS

| | | | |
|---|---|---|---|
| 4,063,546 A * | 12/1977 | Schmid | C09K 5/063 126/400 |
| 4,127,161 A * | 11/1978 | Clyne | F28D 20/02 126/400 |
| 4,187,831 A * | 2/1980 | Eubank | F24D 11/003 126/400 |
| 4,219,076 A * | 8/1980 | Robinson, Jr. | F24J 2/32 165/104.11 |
| 4,222,349 A | 9/1980 | Kadan et al. | |
| 4,258,878 A | 3/1981 | Van Pachtenbeke | |
| 4,283,914 A * | 8/1981 | Allen | F03G 6/06 126/584 |
| 4,344,568 A | 8/1982 | Stewart et al. | |
| 4,406,402 A | 9/1983 | Henriques | |
| 4,462,463 A | 7/1984 | Gorham, Jr. | |
| 4,491,172 A * | 1/1985 | Hitchin | F28D 20/021 126/618 |
| 4,512,288 A * | 4/1985 | Michaud | F24D 12/02 122/18.2 |
| 4,544,028 A * | 10/1985 | Chase | F28D 20/023 126/400 |
| 4,696,338 A * | 9/1987 | Jensen | F28D 20/025 165/10 |
| 4,781,241 A | 11/1988 | Misage et al. | |
| 4,782,892 A * | 11/1988 | Ostbo | F28D 7/0041 165/164 |
| 5,228,505 A | 7/1993 | Dempsey | |
| 5,303,770 A | 4/1994 | Dierbeck | |
| 5,445,213 A * | 8/1995 | Im | F25D 16/00 165/10 |
| 5,755,280 A | 5/1998 | da Costa et al. | |
| 5,915,470 A | 6/1999 | Dierbeck | |
| 5,964,280 A | 10/1999 | Wehrmann et al. | |
| 6,095,240 A | 8/2000 | Hassanein et al. | |
| 6,749,014 B2 | 6/2004 | Ferraro | |
| 7,222,659 B2 * | 5/2007 | Levin | F28D 20/021 165/10 |
| 7,237,602 B2 | 7/2007 | Arai et al. | |
| 7,316,262 B1 * | 1/2008 | Rini | F28D 20/023 165/10 |
| 7,322,404 B2 | 1/2008 | Van Decker et al. | |
| 7,340,899 B1 * | 3/2008 | Rubak | F03G 6/003 60/641.2 |
| 7,356,993 B2 | 4/2008 | Smith | |
| 7,793,651 B2 * | 9/2010 | Sawada | F24H 7/0433 126/400 |
| 7,813,628 B2 * | 10/2010 | Haan | F22B 1/288 392/397 |
| 7,871,449 B2 | 1/2011 | Key et al. | |
| 8,191,615 B2 | 6/2012 | So et al. | |
| 9,658,004 B2 * | 5/2017 | Howes | F28D 20/0056 |
| 2004/0035141 A1 | 2/2004 | Schmidt | |
| 2005/0247430 A1 * | 11/2005 | Gast | F28D 20/00 165/10 |
| 2006/0113068 A1 | 6/2006 | Desai et al. | |
| 2006/0194159 A1 | 8/2006 | Franz et al. | |
| 2008/0066736 A1 * | 3/2008 | Zhu | F03G 6/005 126/620 |
| 2008/0289313 A1 | 11/2008 | Batscha et al. | |
| 2009/0121495 A1 | 5/2009 | Mills | |
| 2009/0260781 A1 * | 10/2009 | Ullman | F28D 20/021 165/104.21 |
| 2009/0287355 A1 * | 11/2009 | Milder | F24D 19/1051 700/277 |
| 2009/0294092 A1 * | 12/2009 | Bahl | F28D 7/00 165/10 |
| 2010/0096115 A1 | 4/2010 | Erickson | |
| 2011/0011572 A1 | 1/2011 | Nagurny et al. | |
| 2011/0100009 A1 | 5/2011 | Lehar et al. | |
| 2011/0174296 A1 * | 7/2011 | Kalina | F28D 20/0039 126/640 |
| 2011/0214629 A1 | 9/2011 | Benoit | |
| 2011/0226440 A1 * | 9/2011 | Bissell | F28D 20/0039 165/10 |
| 2011/0286724 A1 * | 11/2011 | Goodman | F28D 19/04 392/346 |
| 2012/0018116 A1 * | 1/2012 | Mathur | C09K 5/063 165/10 |
| 2012/0055661 A1 | 3/2012 | Feher | |
| 2012/0152487 A1 * | 6/2012 | Styles | F01N 5/02 165/10 |
| 2012/0168111 A1 * | 7/2012 | Soukhojak | F28D 15/043 165/10 |
| 2012/0227926 A1 * | 9/2012 | Field | F24D 11/003 165/10 |
| 2012/0285442 A1 * | 11/2012 | Hung | F24J 2/34 126/620 |
| 2013/0062039 A1 | 3/2013 | Kent et al. | |
| 2013/0081794 A1 | 4/2013 | Tuchowski et al. | |
| 2013/0092105 A1 | 4/2013 | Schmitt | |
| 2013/0133868 A1 | 5/2013 | Lehar et al. | |
| 2013/0145763 A1 * | 6/2013 | Mirmobin | F22B 1/18 60/671 |
| 2014/0069098 A1 | 3/2014 | Ito | |
| 2014/0110080 A1 * | 4/2014 | Bergan | F28D 20/0056 165/10 |
| 2014/0262136 A1 | 9/2014 | Jensen | |
| 2014/0368045 A1 * | 12/2014 | Conry | H02J 3/28 307/75 |
| 2015/0176920 A1 * | 6/2015 | Vendeirinho | F28D 19/00 165/4 |
| 2015/0253084 A1 * | 9/2015 | Beck | F28D 20/0056 165/10 |
| 2015/0316328 A1 | 11/2015 | Trainham et al. | |
| 2016/0201996 A1 * | 7/2016 | Conry | F28D 20/026 165/10 |

OTHER PUBLICATIONS

Kharat et al, "Development of Heat Transfer Coefficient Correlation for Concentric Helical Coil Heat Exchanger," International Journal of Thermal Sciences, May 2009, vol. 48, pp. 2300-2308.

Stanasila et al., "Recuperative Heat Exchanger for High Temperatures," U.P.B. Sci. Bull., 2010, Series A, vol. 72, No. 4, pp. 45-52.

"Graphite Heat Exchangers and Components for Corrosive Applications," Coidan Graphite Products Ltd, Wilk Graphite, May 19, 2011.

"Heat Exchangers", Mersen France Pagny-sur-Moselle, Mar. 24, 2011.

* cited by examiner

US 10,054,373 B2

CONCRETE AND TUBE HOT THERMAL EXCHANGE AND ENERGY STORE (TXES) INCLUDING TEMPERATURE GRADIENT CONTROL TECHNIQUES

CROSS-REFERENCE TO RELATED APPLICATION

The present application is a non-provisional of, and claims priority to, U.S. Provisional Patent Application Ser. No. 62/066,773, filed Oct. 21, 2014, and U.S. Provisional Patent Application Ser. No. 62/220,796, filed Sep. 18, 2015, the disclosures of which are incorporated herein by reference in their entirety.

COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2015, Bright Energy Systems, Inc.

BACKGROUND OF THE INVENTION

Field of the Invention

The exemplary, illustrative, technology herein relates to systems, software, and methods for the management of heat engines—commonly using phase change Rankine-like cycle engines, and more particularly, the management of heat capture, storage, and utilization. As discussed herein, the term Rankine cycle refers to the broad family of cycles where the working fluid is pressurized in a liquid state, perhaps to super or sub-critical pressures and/or perhaps using mixtures of fluids such as those in the Kalina cycle.

The Related Art

Systems that capture and reuse waste heat have been extensively described in the art. Generally, these systems involve a series of engineering tradeoffs to optimize efficiency by optimizing the heat transfer from the heat source to a Rankine engine that converts the transferred heat energy into mechanical energy. Typically, these tradeoffs focused on heat exchanger efficiency and in working fluid characteristics.

Heat exchanger efficiency is a function of the heat exchanger materials and the design of the heat exchanger, while working fluids are optimized to match heat capture and release characteristics of the fluid to the working temperature of the system.

Cost effective energy storage is very important. Electrochemical energy storage has strengths but often have cost, safety, and lifetime concerns. Mechanical energy systems such as pumped hydro and compressed air energy storage provide the vast majority of large scale electricity storage capacity today and have proven long term reliability and acceptable performance.

A suitably efficient and cost effective compressed fluid system needs to store the energy cost effectively and have a thermodynamic process that is efficient in both directions: charging and discharging. A common way this is attempted is for the states of the process to be very similar in each step of the process in each direction; that is, the pressures and temperatures at each point in the process are very similar between the charge process and the discharge process.

There are two broad categories for compressed fluid mechanical energy storage systems: 1) heat pumps as part of a pumped thermal energy storage (PTES) systems and 2) compressed fluid energy storage (CFES) systems, where compressed air energy storage (CAES) systems are a widely explored subset of that area. The distinction here is that the fluid may not be air and it may not always be a gas—it might be a supercritical fluid and there may be parts of the process where the fluid is in liquid phase, or a combination of liquid and gas phases.

PTES systems generally store the energy in a thermal energy difference between some masses. Charging involves increasing the amount of mass that has the temperature (or more rigorously enthalpy) difference, or increasing the enthalpy of a fixed mass [in relation to the environment], or some of both, and discharging is taking that potential energy and converting into to mechanical and/or electrical work.

A classic challenge in trying to use a fluid besides air in mechanical energy storage systems is that it generally requires storage of the low pressure fluid, which is often very voluminous, causing cost and site packaging challenges. Also, if the fluids are chemicals, like refrigerants, the cost of the material has to be considered and as well as the risks and costs of leakage from the system.

The technology herein has applications in the areas of capture and management of waste heat, and the management and optimization of heat engines driven from this heat.

SUMMARY OF THE INVENTION

In accordance with one aspect of the invention, a thermal heat capture, storage, and exchange arrangement, comprises: at least one thermal exchange and storage (TXES) array, each of the at least one TXES arrays comprising: one or more TXES elements each configured to receive a fluid flow therethrough of each of a heat source fluid and a working fluid, with each of the one or more TXES elements providing for a transfer of thermal energy between the heat source fluid and the TXES elements; and a manifold system connected to the one or more TXES elements via piping so as to provide the working fluid to an input of the one or more TXES elements and receive the working fluid from an output of the one or more TXES elements; and at least one heat engine operable with the at least one TXES array to extract heat from the at least one TXES array and convert it to mechanical energy, each of the at least one heat engines being selectively connected to the manifold system of a respective TXES array to pass the working fluid through the one or more TXES elements of the respective TXES array, such that a transfer of thermal energy between the working fluid and the one or more respective TXES elements occurs.

In accordance with another aspect of the invention, a thermal heat capture, storage, and exchange arrangement, comprises: at least one modular thermal exchange and storage (TXES) array, each of the at least one modular TXES arrays comprising one or more TXES elements that each includes: a matrix material substrate; one or more flue tubes or passageways formed or positioned in the matrix material substrate to provide for a flow of a heated source fluid through the TXES element, the heated source fluid provided from a heat source; and one or more working fluid tubes positioned in the matrix material substrate separate from the one or more flue tubes or passageways to provide for a flow of a working fluid through the TXES element; one or more heat engines operable with the at least one TXES array to extract heat from the at least one TXES array and convert it to mechanical energy, the one or more heat engines providing the working fluid to the at least one modular TXES array; and a valve system positioned in piping and ducting connecting the heat source to the at least one modular TXES array and connecting the one or more heat engines to the at least one modular TXES array, the valve system selectively controlling the flow of the heated source fluid to the at least one modular TXES array and the one or more TXES elements thereof and selectively controlling the flow of the working fluid to the at least one modular TXES array and the one or more TXES elements thereof.

In accordance with yet another aspect of the invention, a method of assembling a thermal heat capture, storage, and exchange arrangement, the method comprising: providing at least one modular thermal exchange and storage (TXES) array having thermal storage and heat exchanging capabilities, wherein providing each of the at least one modular TXES arrays comprises: providing a desired number of modular TXES elements; arranging the desired number of modular TXES elements to form the modular TXES array; and coupling the desired number of modular TXES elements to a manifold system via piping to provide for a transfer of working fluid between the manifold system and the modular TXES elements; fluidly coupling the at least one modular TXES array to a heat source to receive a heated source fluid therefrom, with thermal energy from the heated source fluid being stored in one or more of the modular TXES elements of the at least one modular TXES array; providing at least one heat engine that is operable with the at least one TXES array to extract heat from the at least one TXES array via the working fluid and convert it to mechanical energy; and fluidly connecting each of the at least one heat engines to the manifold system of a respective modular TXES array to pass the working fluid through one or more modular TXES elements thereof, such that a transfer of thermal energy between the working fluid and the one or more respective TXES elements occurs.

BRIEF DESCRIPTION OF THE DRAWINGS

The features of the present invention will best be understood from a detailed description of the invention and example embodiments thereof selected for the purposes of illustration and shown in the accompanying drawings.

DESCRIPTION OF PREFERRED EMBODIMENTS OF THE INVENTION

Overview

Figure 1:
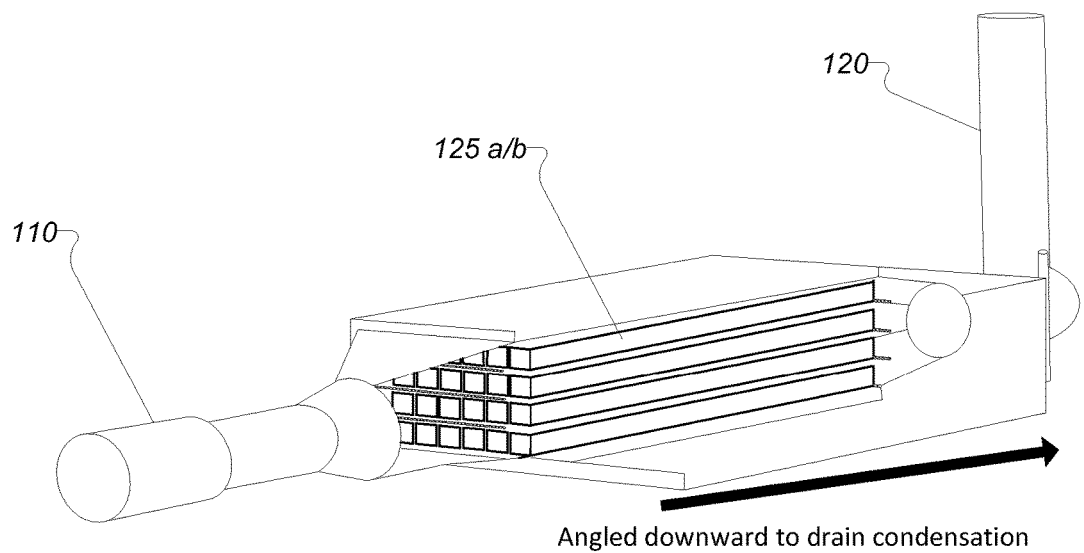
FIG. 1 illustrates the use of a TXES in an existing waste heat exhaust arrangement.

The system of the invention and methods of operation provide a configurable heat capture, storage, and exchange system that can operate at a high level of performance across a variety of operating conditions. This system is called a TXES, a Thermal Exchange and Energy Storage system. Unlike traditional heat exchange and storage systems the described system can operate effectively and reliably with a variety of heat sources, working fluids and pressure regimes, can be assembled easily in modules, is flexible in its configuration, all while being very cost effective. It can be used to exchange thermal energy simultaneously with multiple fluid streams of different compositions or characteristics. It can be used to exchange thermal energy simultaneously with multiple fluid streams of different compositions or characteristics.

In an embodiment, the system may operate as part of the heat exhaust of an industrial furnace, power plant, or other industrial heat source in order to capture waste heat and reclaim it for other uses, including the production of power. The efficiency of heat capture and transfer is a function of the heat transfer from the heat source (e.g. exhaust gases) to a working fluid where the heat can be exploited using well known processes such as Rankine cycle engines. In cases where all of the heat from the heat source cannot be effectively transferred to the working fluid, or where the heat source has insufficient residual heat to effectively heat the working fluid to an economically viable temperature, efficiency is lost or alternative capture and storage mechanisms must be used. A modular capture, storage, and extraction system is described that can capture heat from the heat source across a broad temperature range and then makes that heat available to a suitable working fluid.

One approach is to create a counter flow heat arrangement, where a TXES element is heated by hot fluid (or gas) flowing into the "hot" end of the TXES element, transferring the heat into the TXES element, and the depleted hot fluid exiting the TXES element at the "cold" end. The working fluid moves in an opposite direction, entering the TXES element at the "cold" end, absorbing heat energy from the TXES element matrix, and exiting the element at the "hot" end. This steepens the thermal gradient. The thermal gradient is the zone at which most of the incoming heat is extracted and transferred to a working fluid over a fairly short linear distance, The input (e.g "hot") end is maintained at a temperature that is very close to the input temperature of the heat source, and the "cold" end is maintained close to the input working fluid temperature. This arrangement can provide optimum heat transfer from the heat source to the working fluid via the TXES element matrix.

A TXES array may also be used in parallel flow operation. For example the TXES array can be heated in parallel by a heat pumped working fluid and a waste heat fluid, or alternatively warming two fluids in parallel using the heat stored in the TXES.

For overall process efficiency it is desirable for the thermal storage medium to be able to deliver heat back to the discharging process with minimal loss of entropy over a range of possibly fluctuating heat input levels (e.g. from varying mass flows, temperatures and condensation rates). Traditional counter flow heat exchangers provide immediate transfer of heat from the source fluid to the working fluid, and are thus only effective when the heat source is present and the working fluid is flowing, and are most effective when the thermal fluxes are constantly matched in real time. The thermal gradient is thus unstable and immediately changes as the characteristics of the heat source or working fluid flows change (e.g. hotter or cooler input or working fluids, changed flow rates). This results in engineering design challenges in matching the heat source with the heat engine, as well as operational challenges in start stop operation, one of the major challenges for Rankine-style thermal power plants. TXES arrays and TXES elements can be configured to capture and store heat that would normally pass through uncaptured in a traditional heat exchanger (e.g. if the working fluid is unable to absorb as much heat as the input contains). The TXES element stores excess heat from the input fluid, in effect, charging the TXES element with heat energy. Charging the TXES element shifts the location of the temperature gradient within the TXES element. By controlling heat source and working fluid flows (e.g. the heat added to the TXES element and the amount of heat rejected into the working fluid may be varied under process control), the location and shape of the temperature gradient within a TXES element may be managed.

A TXES array operates across the varying temperature ranges of the heat source(s) (whether these sources are from exhaust gases, liquid heat sources such as in geothermal or industrial heat removal, or other heat sources or from compressed fluid from a compression charging process) to capture, store, and reject heat as required. The TXES array provides for multi-stage heat transfers into temperature optimized heat engine systems. It also allows a separation of the rate of heat exchange with the heat source and the heat required by a heat engine. This flexibility permits more efficient capture and transfer of heat energy from the heat source into one or more working fluids. In this system, in a first example implementation, the discharge process is essentially a Rankine cycle, where the fluid is pressurized in the liquid state (keeping the pressurization energy relatively low) and then it is heated, then vaporized and then superheated. Then it is expanded to extract mechanical energy and then it is condensed back to a liquid so it can be pressurized again. The latent heat of vaporization is a substantial percentage of the heat input that can be recovered from the system. The hotter the temperature, the higher the net work is vs. the latent heat penalty that is required to vaporize the fluid.

The system described provides waste heat capture and storage across a wide range of heat input ranges, and provides a smoothing function for variable intensity heat sources. The heat extracted from the system may be time delayed from the heat in the input heat source.

The ability to integrate the waste heat capture process with an electricity energy storage system (one that uses electricity for the source energy when charging) to create a hybrid bottoming cycle and electricity storage system provides for superior efficiency.

A valuable asset in any heat exchanger is better cost per surface area. In a pressure vessel tube, the wall thickness of the tube is set by the pressure, material strength, safety factors and the diameter of the tube. The material cost of the tube per unit surface area is proportional to wall thickness. So less material per unit surface area is achieved with smaller diameter tubes. The pragmatic challenge is the cost of connecting many more small tubes together; manifolding vs. less labor and joining costs for bigger diameter tubes that have more material cost. The use of very long tube lengths, enabled by the helical forming of the tubes as used in some embodiments, allows fewer discrete tubes to be used to get the same surface area without the use of fins or other tricky-to-manufacture features. The helical arrangement also allows more uniform dispersal of the heat exchange area into the TXES element.

These and other aspects and advantages will become apparent when the Description below is read in conjunction with the accompanying Drawings.

Exemplary System Architecture

FIG. 1 illustrates an example implementation of the TXES arrays in an exhaust system. In operation, the exhaust system conveys hot exhaust gases from a heat source, through an exhaust stack (110), through one or more TXES arrays (125a/b) prior to exhausting the now cooled exhaust gases into a chimney (120). Note that the stack and chimney in this example are illustrative for an exhaust gas-based arrangement. Exhaust gas and condensate treatment systems (not shown) may also be integrated into the TXES array, or as a pre- or post-processing arrangement as necessary to treat the exhaust gases in order to remove contaminates such as sulfur or nitrous oxides. Other arrangements for heat sources comprising heat containing fluids (e.g. heat sources with liquid, two-phase, or supercritical fluid inputs as opposed to gaseous inputs), or for further pre- or post-processing of exhaust gases may be added without deviating from the scope of the invention.

TXES arrays (125) may be installed so that they facilitate the collection of condensate that forms during the heat transfer from exhaust gas into the TXES elements that make up a TXES array. One method is to slant the TXES elements so that the condensate drains to a collection point, where it is collected and may be further processed. Note that condensate is often still warm (e.g. 70C) and can be run through additional TXES elements (either within the same TXES array or in one or more additional TXES array(s)) that are optimized to extract the lower levels of heat remaining in the condensate.

Figure 2:
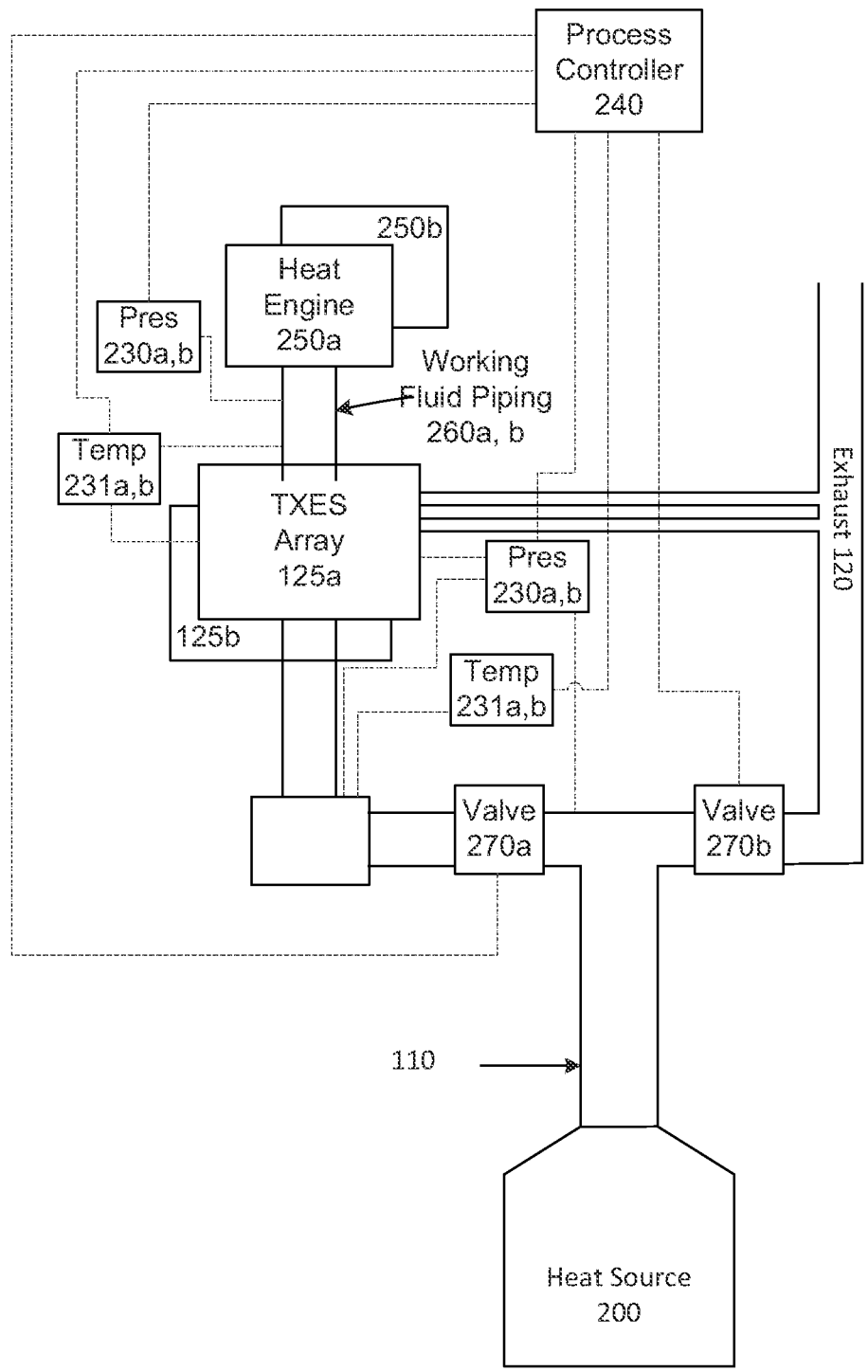
FIG. 2 illustrates an example system of the invention.

FIG. 2 illustrates an implementation of the invention for capturing heat from gaseous inputs. This exemplary implementation comprises a combustion heat source (200), one or more exhaust stacks (one stack shown as 110, others omitted for clarity) that transfers the hot exhaust gases from a heat source to one or more arrays of heat storage/exchanger elements (called TXES arrays and TXES elements respectively) (e.g. 125a, 125b). The exhaust stacks may be fitted with one or more optionally process controller controlled exhaust system dampers (270a, 270b) that control the flow of hot exhaust gases from the heat source into a process controller-specified one or more TXES arrays (125a, 125b), and TXES arrays being arranged so the hot gases flow from the heat source through at least one of the selected TXES arrays prior to being exhausted to the chimney (120). In some implementations where the exhaust gases may vary in temperature, the TXES arrays may be arranged in series, so that a first TXES array receives the hottest exhaust gases and a second TXES array receives lower temperature exhaust gases. This permits the capture and reuse of additional heat energy from the exhaust gases by matching the exhaust gas temperature to at least one TXES element (and supporting work conversion heat engine) that is optimized to capture, store, and reuse the heat energy at the current temperature of the exhaust gas.

Computer controlled or manually controlled dampers (270a, 270b) may be utilized to control input gas flows from the heat source to one or more selected TXES arrays by opening and closing dampers. The process control computer (240) controls the exhaust dampers (270a, 270b) when the system is operating under process control, such as when the exhaust gas temperatures are constantly varying and real time optimization of the heat exchange and reuse process is required. Manual damper settings may be used for systems with more constant exhaust gas temperatures and pressures. Alternatively, a combination of both damper control techniques may be used.

The dampers may be used to isolate a TXES array from the flow of exhaust gases. This may be done for varying reasons, e.g. the TXES array has reached a desired operating temperature and the heat can be more effectively utilized in another TXES array, because the exhaust gases are at a temperature that a specific TXES array will not optimally extract heat from the exhaust gasses, or to take a TXES array offline (e.g. for maintenance).

In some embodiments and during some operational conditions, a bypass stack may be utilized to direct the hot exhaust gasses in such a way that no heat is captured by the system. The bypass stack use is controlled by an additional damper/valve (270b). In some implementations, the bypass stack damper may configured to "fail open" to provide for the safe operation of the exhaust system in the event that one or more the TXES arrays are not functioning correctly (e.g. during a failure of heat extraction subsystems).

The exhaust stack, chimney, and TXES arrays are preferably instrumented with sensors, for example, temperature and pressure sensors that measure the temperature and pressure of the exhaust stack, chimney, and TXES arrays, process fluids and individual TXES elements (e.g. 230a, 230b, 231a, 231b). Each of the temperature and pressure sensors are connected to the process controller (using a sensor appropriate mechanism, typically electrically) in order to provide inputs to the process controller provided control algorithms that manage the heat extraction, storage, and reuse within the TXES arrays.

The TXES element(s) are further fluidly connected (with working fluid piping 260a, 260b) with one or more heat engine subsystems (e.g. 250a, 250b), where the working fluid for each heat engine is circulated through one or more of the TXES elements of at least one of the TXES arrays. TXES elements may be "hot" or "cold". A hot TXES element is a TXES that is heated by an input (such as exhaust gas), then retains the heat and transfers it to a working process fluid. A cold TXES element is one that is cooled by an input, retains the reduction in heat, and absorbs heat from a working process fluid. A TXES array may comprise only hot TXES elements (in varying degrees), only cold TXES elements (in varying degrees), or a combination of hot and cold TXES elements.

The working fluid flow path for each heat engine may differ (e.g. different heat engine working fluids may flow thru different TXES elements). In more limited implementations, portions of the flow path may be preconfigured and/or configured using manually controlled valves, or alternatively, the valves may be omitted and that portion of the fluid path is statically implemented. Each working fluid flow path is configured using process controller controlled values so that the working fluid is passed through at least one element of a TXES array, where heat transfer between the working fluid and the TXES element occurs (either heating or cooling the working fluid). In some operating modes, the heated working fluid is then circulated through a turbine and condenser to convert the heat to shaft work in a traditional Rankine cycle, or the heated working fluid is routed to an external storage tank (not shown). In still other operating modes, part of the working fluid is routed through TXES elements and part of the fluid is routed in a way that it bypasses the TXES elements, and is recombined with the fluid heated in the TXES elements in order to produce specific temperatures of the resulting working fluid. Processor controlled valves thus set the heat engine fluid routing paths through one or more TXES arrays and/or TXES elements. This permits the more efficient extraction of stored heat from the TXES elements by controlling the flow of a working fluid through selected TXES elements whose temperature corresponds to the efficient operating range of a particular heat engine. In this way, the heat engine/process fluid used and the heat of/flow paths through the TXES elements can be dynamically matched to the TXES elements as they change in temperature (as they are heated and as heat is extracted from them).

In other operating modes, a working fluid is circulated that has been previously heated (such as by a different TXES element, or from an external working fluid storage) and is used to transfer heat into a TXES element for the purposes of heat distribution or pre-heating of a TXES element (for example, to reduce thermal stress on the element when it is exposed to higher heat exhaust gases). This heating flow may be either counter-flow to the exhaust gas flow or may be made in the same direction through the TXES elements as the exhaust gas flow (e.g. parallel flow). A flow reversing valve may be provided to reverse the direction of the working fluid flow through one or more TXES elements. This value may be part of the attached heat engines, or may be integrated into a TXES array.

In some embodiments, at least one of the valves that control the process fluid flow may be manually operated. This arrangement is particularly suited to when the TXES array is deployed in an arrangement where the amount of heat extracted from the exhaust gases is approximately matched to the amount of heat extracted from the TXES array, and where the system runs at heat equilibrium (the heat inflow matches the heat outflow at any particular point in time).

Each heat engine subsystem may operate at different temperature ranges, and may be optimized to operate within specific temperature ranges using the same or different process fluids. Several types of heat engine subsystems are contemplated.

A major engine or heat pump process type is the Rankine process. Heat engines of this type operate by pressurizing the working fluid in liquid phase which correspondingly has low pressurization work energy, but high heat input required to boil the working fluid. These systems often have fairly high working pressures and the heat addition process needs to accommodate these working fluid pressures. Conventional Rankine engine fluid heat systems most commonly use heat exchangers separating the high pressure working fluid from a flowing heat supply, often combustion gases. The key design features of Rankine heating systems are cost effectiveness when dealing with the fairly high pressure working fluid and the often low convective heat transfer rates from the heat source.

Note that there is a variety of engine cycles that are often similar but have, for example supercritical fluid pressure, and thus don't technically have a phase change in the high pressure part of the system. Similarly, mixtures of fluids have temperature varying boiling processes. The term Rankine or Rankine-like refers, as used herein, to the broad heat engine/heat pump category where there is a phase change in cold end of the process and to engine systems where pressurization occurs in liquid phase. Another major heat engine or heat pump process is the Brayton cycle which operates completely in gas phase. Since the pressurization of the fluid is done in gas phase, there is a lot of pressurization work needed, but the lack of phase change in the process lowers the amount of heat added per unit of working fluid vs. a Rankine process. For example, in a cold thermal storage Brayton system a working fluid gas is compressed, the superheat is removed into a hot TXES element by passing the gas through a TXES element, allowing the cool high pressure gas to expand into a cold state. This cold working fluid gas is then warmed using a cold TXES element, chilling the TXES element (producing a cold TXES element). The charging process is reversed in a process by which a compressor pulls a working fluid gas through the cold TXES element (chilling the work fluid and heating the TXES element) and then compresses the now warmed working fluid (creating a high pressure gas). The warmed working fluid is routed through a hot TXES element to create a hot gaseous working fluid. The hot working fluid is then expanded back to near its starting temperature while producing shaft work.

A key benefit of a TXES element over a container-based heat storage approach (e.g. rock tanks) is that in a container-based approach the pressure vessel is wrapped around all of the thermal mass, while the TXES element requires much less structural material for the pressurized volume since the thermal storage media is outside the pressure vessel.

The broad advantages of a TXES design (e.g., energy storage, thermal selectivity, and power smoothing) provide value to a variety of heat cycle engines. For example, in a system with two Rankine engine subsystems, the first Rankine engine subsystem may be configured to operate more efficiently at temperatures between ambient temperatures and 150 degrees C., and the second Rankine engine subsystem may be configured to operate most efficiently at temperatures above 150 degrees C. In some embodiments, a plurality of differing working fluids may be used, each as part of a separate Rankine engine subsystem. The working fluids and heat engine characteristics are chosen based upon their operational characteristics (e.g. heat of vaporization, specific heat vs. temperature and pressure, max temperature limits, available flow rates) vs. heat source temperatures. This enables a broad range of optimum performance across power levels and heat source temperatures.

Alternatively, several heat engine subsystems sharing common operating parameters may be provided in parallel to increase the heat extraction and shaft capacity of the system. These systems may be interconnected or operated independently.

As such, the selection of heat engine processes, process fluids, operating pressures, and turbine/condenser configurations for each heat engine subsystem may be independently configured and information related to these configuration parameters (process fluid critical temperatures, working flows, process fluid tube flow and heat exchange rates, control parameters for pumps and storage capacities, etc.) is stored in the process controller.

The system of the invention includes process controller-controlled temperature and pressure sensors embedded within and/or mounted upon the TXES elements (e.g. 230a, 230b above) and on the process engine fluid piping (260a, 260b), as well as process controller controlled dampers and/or valving (e.g. 270a, 270b, and valves inside an TXES array) effective to route working fluid flows to/from one or more TXES elements, pumps, one or more heat engines, and one or more cold stores (not shown). The sensors and valves are connected to the process controller and are controlled by it.

The process controller is also programmed with characteristics of each TXES element and TXES array to which it is connected, as well as the sensor, valve, and piping interconnection information. Using this information, along with current TXES element temperatures (on an element by element basis) and input temperatures, the process controller may select, based upon the current temperature profile of each individual TXES element, the most appropriate heat engine subsystem(s) to utilize to extract heat from each TXES element in the TXES array. The selection of heat engine subsystems to use may not be exclusive; a plurality of heat engines, each optimized for operating using differing temperatures, pressures, and/or working fluids, may be connected to a single TXES array.

In some embodiments, a plurality of TXES arrays are used. This plurality of TXES arrays are fluidly connected using piping and process controller controlled valves and manifolds that allow the configuration of the flow of these exhaust gasses and process fluid through one or more TXES elements (in each TXES array) for the purpose of managing the amount of heat stored in each of the TXES elements. In an example, exhaust gasses are preferentially directed into TXES elements that require additional heating, by virtue of the process controller controlling one or more exhaust valves/dampers to direct the hot exhaust gasses to the selected TXES elements. In cases where the heat source is provided as a hot fluid, the hot fluid is directed, by means of the process controller controlling one or more valves and pumps, into one or more TXES elements that require additional heating.

The process control computer thus uses the dampers, valves, sensors, and heat engine pump controls to the heating/heat extraction of the TXES arrays (and of each element of a TXES array) in order to optimize the heat extraction, storage, and use of the available heat energy.

It should be noted that the system of the current invention, while depicted for heated exhaust gases, would work equally well for heat extraction/storage of waste heat from hot liquid or mixed phase sources with minimal modification in ways understood by those skilled in the art. The primary difference is that the fluid properties are different with liquid having much higher densities and thus heat per unit volume and higher convective heat transfer coefficients vary based upon the fluids chosen. Correspondingly, the tubing passages may be of differing materials, sizes and/or wall thickness in order to support differing fluids, pressures, and temperatures. These considerations can be factored into the design of the TXES element flue and working fluid tubes, and the subsequent packaging of flues and tubes that have differing thermal characteristics into a TXES element.

An interesting example is a process where a Rankine steam process rejects its heat as a heat addition to a Rankine ammonia process running between the steam condensation process and ambient temperature. One TXES element design could have features that optimize exhaust gas heating the steam process and another TXES element (and/or TXES array(s)) may be optimized for condensing steam as the heat source (the heat being transferred to boiling and superheating ammonia).

The current invention could also be used for "cold" thermal storage which stores "cold" for subsequent use. In this variant, the charging process warms a cold source fluid by transferring heat energy from a previously heated TXES element. The discharge process chills the working fluid while warming the TXES element.

One exemplary process is the use of a TXES arrangement as part of a liquefied natural gas (LNG) regasification apparatus. In this exemplary embodiment, LNG is passed through the flues (or through a process tube) of a TXES array, cooling the TXES element(s) and warming the LNG until it changes to gaseous state. The gaseous natural gas is the output of the process. A Rankine-like process may be used to reverse the process. In this example, the Rankine engine uses methane, which is pressurized in the liquid state and then boiled and super heated, by perhaps a heat exchanger cooling ambient air when warming the methane, and this pressurized gas can be expanded and then the cold low pressure methane is condensed by the "cold" stored in the TXES element. This provides the liquid methane that can then be pressurized to continue the process.

In an another alternative implementation, hot gases may be flowed through the flues and the LNG is flowed through the working fluid tubes to achieve the same effects without deviating from the scope of the invention.

Note that the LNG warming and process fluid heat flows do not need to be balanced as with current heat exchangers, nor do they have to occur at the same time (e.g. the heat flows may be temporally displaced, such as during start/stop of the LNG or process fluid flows). For example, LNG may be continuously gasified in the absence of power generation, or power may be generated by the Rankine-like process in the absence of LNG gasification by using the storage capacity of the TXES elements. The TXES elements provide the necessary storage capacity that supports the heat supply/demand imbalance and temporal shifting of the heat exchange processes.

Another exemplar process supported by TXES systems is air liquification. Air liqueftaction converts gaseous atmospheric air into liquefied air (or its component parts, liquefied oxygen, nitrogen, etc.) by passing it through one or more TXES elements pre-cooled to the appropriate temperature to liquefy the desired element. Different TXES elements, precooled to different temperatures, may be used in order to manage the liquefied element produced. Heat extraction from these TXES elements, and its subsequent conversion to work is through standard Rankine-like processes. Note that with the variable process flow routing available to TXES systems, a TXES element may be heated and cooled throughout the useful heat range for all of the gasses (as opposed to single element liquefaction systems), more effectively utilizing all of the heat in the TXES element.

Figure 3:
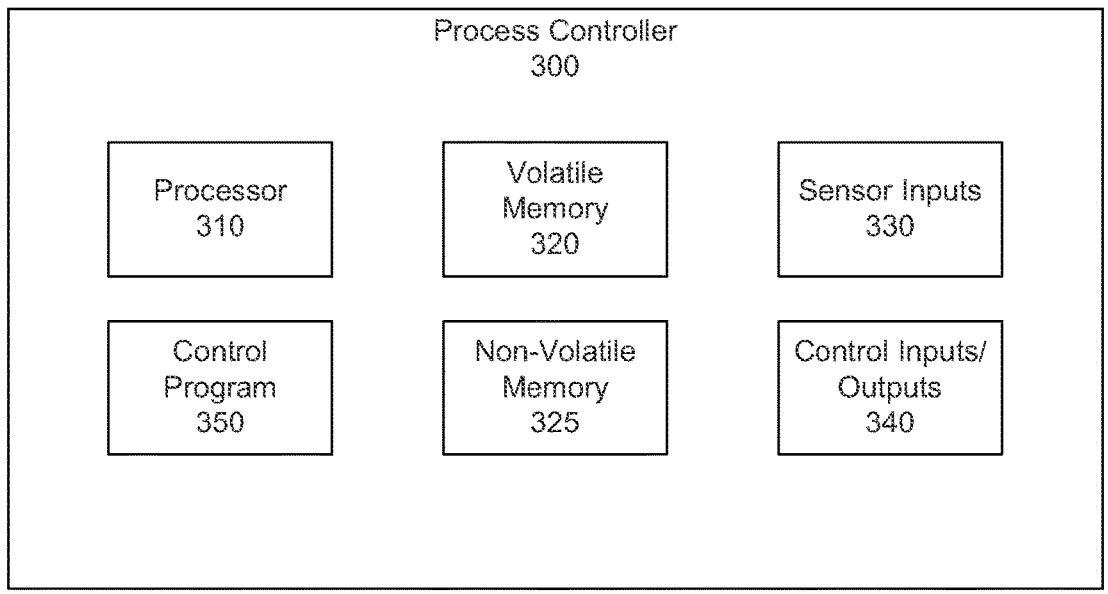
FIG. 3 illustrates the components of computer-based process controller utilized by the system.

FIG. 3 illustrates an exemplary process controller (300) of the system. The process controller comprises a processor (310), volatile (320) and non-volatile (325) memories, such as RAM, ROM, PROM, EEPROM, and the like, sensor inputs (330), which are connected to sensors such as temperature and pressure sensors 230 of FIG. 2, control input/outputs (340), connected to valves (e.g. valves 270 of FIG. 2), temperature and pressure sensors associated with process fluid stores (e.g. cold stores), pumps (not shown), and heat engine components (e.g. turbines, condensers), and a control program (350) executed by the processor in order to read values from the sensors and to determine and subsequently set values for the control input/outputs in order to effect the control processes described herein. Other sensors may be connected to the pumps, turbines/condensers, and other operating equipment to detect operating conditions and/or malfunctions.

Each of the sensor inputs and control outputs is electrically connected to the respective sensor/controlled component of the system. Wireless connections may be utilized for some or all of the connections without departing from the spirit of the invention.

Within the memories of the process controller, one or more control programs are stored. These control programs are executed by the processor(s) of the process controller and implement the control methods described herein.

Additionally, within one or more memories of the process controller, configuration information regarding the heat engines' subsystems, the exhaust gas manifolding arrangement, the working fluid piping arrangement, and each TXES array (including individual TXES element information) arrangement, as well operating and control parameters for each of the components and subsystems are stored. This information is used by the process controller in order to interpret sensors' inputs and to set control outputs in response to its control programming.

In addition, the process controller memories store current operating information, such as current temperature and pressure for each of the sensors in the system.

Returning to FIG. 2, each TXES array comprises one or more TXES elements (125a/b), monitoring sensors (230a/b, 231a/b), valves/dampers (270a/b), and piping (260a/b) effective to provide fluid flow between an array input manifold, one or more TXES elements, and an array output manifold. Each TXES array is connected to a heat source stack (110), the spent heat source is routed to an exhaust chimney (120) or suitable vent, and working fluids for extracting captured and stored heat in the TXES elements from one or more heat engine subsystems is provided via at least one working fluid piping (260a, FIG. 4, 430) and at least one working fluid output piping (260b, FIG. 4, 450) effective to distribute and collect the respective working fluids to, from, and between the individual TXES elements of the TXES array. A plurality of working fluid piping may be provided in order to: a) provide different fluid paths having different characteristics (such as differing path length and/or flow rates), and b) be connected to different heat engines. Additional valving and dampers, connected to and controlled by the process controller, are provided to configure the flow of working fluids and heated exhaust gases to, from, and between individual TXES elements of each TXES array (and between TXES arrays in multiple TXES array configurations).

Each of the TXES elements, valving, piping, and manifolds described herein may be insulated as desired to better maintain the temperature of the TXES elements and the efficiency of the exchange processes. Mineral wool, fiberglass, or other well-known insulating materials may be used as needs dictate. Depending upon uses, external covers may be provided to protect the insulation from exhaust flows and/or the weather.

Figure 4:
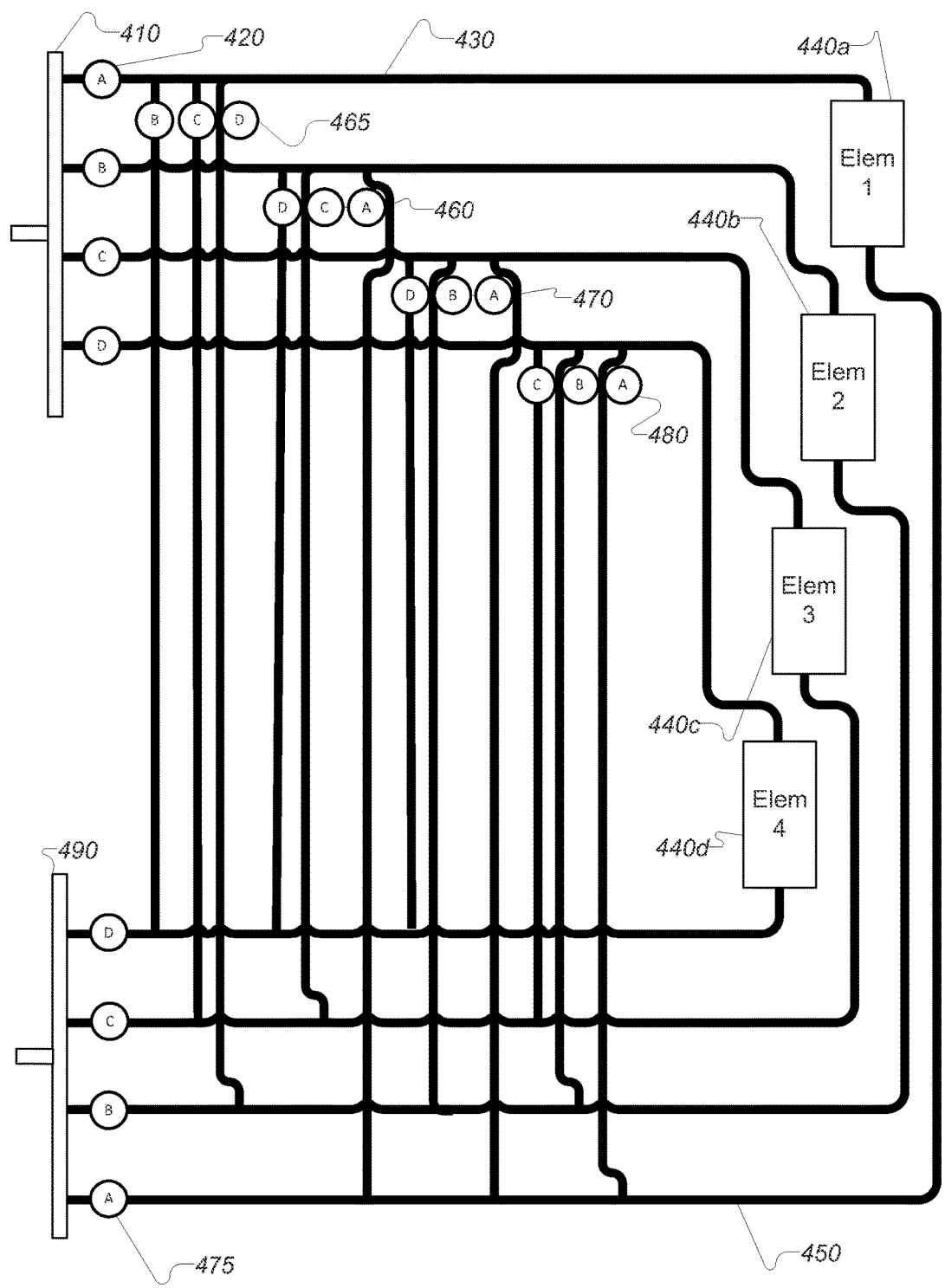
FIG. 4 illustrates an example working fluid loop within a thermal exchange and energy storage (TXES) element array.

FIG. 4 illustrates an example TXES array arrangement of the present invention, with an example input manifold (410) and computer controlled valves (420, 460, 465, 470, 480), working fluid piping (430), and four TXES elements (e.g. 440a/b/c/d) that can be configured to produce any desired fluid path through the elements of the TXES element array. In this, the TXES array comprises four elements, but any number of TXES elements may be used when creating a TXES element array.

Each of the TXES elements used in the TXES array may have similar or differing thermal exchange and storage characteristics. Thus, a TXES array may comprise TXES elements configured for high temperature operation and have different TXES elements that are configured to optimize the heat transfer at lower temperatures. Alternatively, all of the elements of a TXES array may have similar heat capture and transfer characteristics.

Interconnection of Manifold to TXES Elements.

TXES elements are typically fashioned to have flue channels integrally constructed as part of the element. In examples where heat source gas tubes (e.g. flues) are described, the invention may be utilized using tubeless TXES elements designs as described herein, or may be constructed using flue tubes of conventional designs (e.g. steel tubing).

Depending upon the arrangement of TXES elements desired, individual manifold tubes may be connected between the heat source input manifold of a TXES array and the flue tubes of individual TXES elements with a pipe. This pipe may additionally have a process controller controlled damper/valve inline to control heat source gas to flow to the specific TXES element. A similar arrangement is used for handling the spent heat source gases after they have had heat extracted from them.

A second approach is to arrange the tube ends (for the tubes embedded in the TXES elements) in a row so that a straight pipe with periodic stubs can be fabricated that connects many tubes to a common manifold. This arrangement is particularly effective for a parallel arrangement of TXES elements (for high flow operating conditions), where exhaust gases are divided and directed into a plurality of TXES elements simultaneously. The manifold may have its input controlled by a process controller controlled valve/damper, which will simultaneously enable/disable heat input to the one or more TXES elements connected to the manifold.

Connecting the working fluid manifold stubs to the TXES element can be done a variety of ways, but cost is an important consideration. As such, a butt splice orbital weld can be cost effective, but may require tight tolerance alignment and length matching between the tube ends and manifold stubs for a weld.

Another option is a socket feature where tube sizes between the manifold stubs and the tube ends have inner and outer diameter sizes that allow one tube to slide inside the other with appropriate tolerance to allow a sweating or brazing operation to create the hermetic joint. Another option is compression fittings. Alternatively, flexible or malleable tubing or hoses may be used to mate the manifold to the TXES element-embedded process fluid tubes and flues.

Alternatively, multiple TXES elements may be arranged in parallel within a common "plenum" so that heat source gases flowing through the plenum must pass through one or more TXES elements. Each TXES element may have an individual damper(s) to control its heat input from the plenum.

As described herein, the configurable working fluid (and exhaust gas/heat source) flows provide great flexibility in the operation of TXES array. In some implementations, some of the piping/valves may be expanded (by adding piping/valves) to provide additional flow possibilities, or may be restricted (by replacing process controller controlled values and alternative flow pipes with manual values and/or static piping). The example arrangement of FIG. 4 is provided as a demonstration to illustrate the flexibility of the TXES array. In a first example embodiment, demonstrating parallel fluid flow, a process fluid enters the input manifold 410, where it flows through valves 420a, 420b, 420c, and 420d, through the piping, and into TXES elements 440a, 440b, 440c, and 440d, where it is heated and then flows out through valves (475a, 475b, 475c, 475d) and into the output manifold (490). All other valves 465, 460, 470, 480 are closed. In a second example embodiment, demonstrating serial fluid flows, a process fluid enters the input manifold 410, where it flows through open valve 420a to TXES element 440a. After being heated in TXES element 440a, the process fluid flows out, where it is blocked by closed valve 475a. The fluid flows to valve 480a (which is open, and 420d is closed), into the input side of TXES element 440d where it is heated some more, and then passed out to the exit manifold 490 via open value 460d. In a third example, demonstrating alternative flow paths where the process fluid flow is split as it flows between TXES elements in the array, a process fluid enters the input manifold 410, where it flows through open value 420a to TXES element 440a. After being heated in TXES element 440a, the process fluid flows out, where it is blocked by closed valve 475a. The fluid flows to valve 470a and 480a (which are open, and 420c and 420d are closed), into the input side of TXES elements 440c and 440d, and then passed out to the exit manifold 490 via open value 475c and 475d, Other combinations of flow paths; serial, parallel, and combinations of serial and parallel are made possible by opening and closing the appropriate valves (420, 460, 465, 470, and 480)

An advantage of the TXES array design is that there are many places that the intake and discharge paths of both heat source gases and working fluids can be dynamically altered by the process controller controlled valves in order to bypass individual elements of a TXES array. Determining when to bypass a particular TXES element is performed by the process controller in response to its control program, which makes the decision, in part, based upon the temperature and pressure sensor readings of the input heat sources, the characteristics of the TXES element (e.g. its heat exchange coefficients in each of its flow pathways), the current operating status of the TXES element (e.g. its current temperature and temperature profile), and the characteristics of the heat engine subsystems (such as operating temperature, working fluids, operating pressures), and the various operating modes that may be anticipated in the future.

There are a variety of variables, often highly coupled together that determine the operating ranges and these could affect the configuration of the TXES or the operation of the TXES as operating conditions vary. The operating pressure range or ratio in Rankine-like processes determines the temperature range or ratio. The pressure also sets the boiling temperature (or more generically for super-critical pressures) the amount of enthalpy required to change a mass of the fluid. Often a very large fraction of the heat absorbed by the fluid is at or near that boiling or quasi-boiling temperature. This is a powerful factor on the behavior of a TXES. So, for example changing the pressure of the working fluid changes the temperature at which the working fluid absorbs or delivers heat to the TXES.

The peak temperature is also important as that determines the maximum enthalpy available for an expansion or delivered from a compression (e.g. heat pump) process. As noted, the pressure ratio available across compressor or expander determines the temperature change for a specific fluid. A common objective in Rankine-like heat engines is to maximize the enthalpy exchange across the machine (expander) in relation to the total heat input. In a heat pump, a common objective is the opposite, minimize the machine enthalpy (compression) for the total heat delivered at the higher pressure. In a heat pump/heat engine energy storage system, these counter considerations cancel out somewhat in an ideal case. Like most systems, pragmatic considerations include cost and real-world efficiency considerations. For the TXES design, there are the factors associated cost per unit energy stored as well as the achievable minimal temperature differences between the fluids and the storage media as discussed elsewhere. A flow control system that lets the system vary the temperatures, pressure, fluids and mass flow rates increases value to the system that TXES supports a wide variety of possible systems.

FIG. 15 is a table illustrates a few of the vast combinations of temperatures and pressure that different fluids operate effectively over. There are also mixtures of fluids that can infinitely vary the properties by simply changing the relative amounts of different compounds to be used in a process.

FIG. 15

| Fluid examples | Operating range for cost effective use of positive displacement compressor expanders | Other factors |
| --- | --- | --- |
| Ammonia | 320--650 K, 25-250 bar | some toxicity, but widely used industrial/agricultural chemical |
| Steam | 500-900 K, 2-200 bar, | Wants a higher cold side temp than ambient to improve fluid density |
| Dimethyl Ether | 330-460 K, 15-100 bar | Less toxic, but lower performing thermodynamics super critical at 400 K, 53 bar |
| Propane | 330-420 K 20-80 bar | super critical at 370 K, 42 bar, high work back ratio |
| R-152a | 350-470 K 20-100 bar | $T_{critical}$ ~386 K |
| Carbon Dioxide | 330-380 K 155-400 bar | Very high pressure on low side (~70 bar, critical point at ~304 K). Widely explored by industry. Low-toxicity. |
| Air/exhaust air | Direct Combustion: 800-1800 K Combustion turbine exhaust: 700-800 K Internal combustion engine exhaust: 600-800 K Steam generator stack gas: 380-460 K (Generally just above ambient pressure to <50 kPa gauge) Combustion turbine compressor air: 350-750 K 2-25 bar | waste heat source fluid, no phase change |
| Closed Brayton - Argon | 600-900 K, 6-16 bar | Brayton heat pump energy storage system |

Many heat engine systems work with multi-stage systems. In Rankine-like systems, another interesting technique is the reheat cycle which pressurizes the fluid once where it is boiled and superheated, expanded and then reheated in gas phase and then expanded again. These systems generally have higher pressures because there is more total enthalpy delivered and extracted and this requires a higher pressure ratio. The higher pressures can often lead to the fluid being supercritical—that is where there is no longer a fixed temperature at which the boiling process occurs. For sensible heat TXES and exchange systems, avoiding that fixed temperature at which lots of enthalpy is exchanged is useful.

Since there are two heating processes for engine mode there is flexibility in how those two or more or more heating processes are arranged with respect to the heat supply. Since the reheat process(es) do not have a latent heat absorption process, that tends to be in the hotter heat supply section. Another technique is to simply run two or more process with common or different fluids in an array of TXES elements. In contrast to reheat cycles, the pressures in each process can be tailored independently and thus can offer selecting pressures to assist with the pinch point heat capture challenge.

As noted above, a key variable is the boiling or quasi-boiling point which varies significantly with pressure for TXES functioning as a heat exchanger between two fluids (typically an exhaust gas or waste heat stream and a heat capturing working fluid). This is well known for those skilled in the art of these designs as a pinch point analysis. It is a process of maximizing heat capture from the waste heat flow and yet pragmatically finding an overall system that is cost effective enough for economic deployment.

The flexibility offered by the multiple flow passageways and the modular blocks provides a selection of values from higher efficiency operation, storing energy for delivery when delivery is needed independent of the heat supply, the ability to simply run the machine in reverse and put heat back into the system with work, lower the cost of heat capture due to the cost effective tubing designs discussed elsewhere, vary at what temperatures the heat is added or extracted from the TXES by changing one or more of these variables—leading to cost effectiveness improvements for the TXES.

The following figures depict arrangements of TXES elements with innovative features around construction and the resulting performance. While FIGS. 5-12 describe implementation details for various embodiments, some general aspects of TXES elements provide benefits alone and in combination. These include element shape/configuration, matrix materials, and working fluid piping configurations.

Each TXES element is constructed using modular design and may take different forms and sizes based upon the requirements for implementation. TXES elements may have various size ranges depending upon the heat flow characteristics desired. TXES elements are designed for fast, modular construction and easy transportability. A number of features and design elements are included to facilitate this. For example, the TXES elements uses lengths easy to transport by semi trailer and masses of the elements are easy for crane lifting operations. TXES element sections need sufficient bending strength to allow removal from the casting/preparation to a truck and then from truck to be stacked, but do not need additional structural strength in order to function. In some cases, reinforcing steel (e.g. rebar) or steel tension members are used to reinforce the TXES element. These elements are used for the lifting and transport of TXES elements whose design loads would otherwise put the concrete of a TXES element into tension. A TXES element is typically two to fifteen meters in length, is roughly square or rectilinear in cross section, and has sides of dimension 0.2 m to 2.5 m. The mass of a TXES element might be about 6000 kg although the application could vary the size from about 100 to 18000 kg.

The modular design of TXES elements allows casting or otherwise preparing segments of the overall system such that many of the segments can be stacked in parallel and also placed in series. Series arrangements allows longer path lengths for the input heat source and working fluids, thus permitting more of the heat to be extracted from the heat source, stored in one or more TXES elements, and then extracted into the working fluid of an heat engine subsystem optimized for the specific characteristics of the heat being extracted. Part of the element optimization in TXES array design is the creation of TXES elements with differing defined characteristics. For example, a first TXES element may be created with a plurality of working fluid pathways, each pathway having the capability of raising the temperature of a working fluid by up to 70 degrees C. at a flow rate of 50 liters/minute. A second TXES element may be created that has a capability of raising the temperature of a working fluid by 300 degrees C. at a flow rate of 100 liters/minute.

Similarly, TXES elements may be constructed that can accept working heat inputs of 100, 300, 500, or even 1000 degrees C., and effectively capture that heat within the TXES element. In addition, TXES elements may be constructed to operate with differing pressures, flow rates, and characteristics of the heat source. In an example embodiment, a first TXES element may have flue passages sufficient to pass 300 cubic feet per minute of heat source gases, while a second TXES element may have flue passages that pass only 150 cubic feet per minute of heat source gases. A third example TXES element may operate at 3 psi of pressure, while another TXES element may be designed to permit the free flow (e.g. unpressurized) of heat source gases.

Typically, the TXES element comprises structural elements, thermal storage medium (typically comprising a matrix and filler), one or more working fluid pathways, and one or more heat source pathways, called flues. The structural strength may be provided by expressly structural elements such as rebar or may be integral to other components of the element, such as the matrix itself.

Features cast into in the TXES elements to allow easy lifting and placement into stacks on a truck or in the final installation are helpful to save labor during these processes. Another valuable feature associated with TXES element lifting and handling are shallow notches in the bottom and sides that allow lifting straps to be used to lift and place the TXES elements while easily being removed and not impeding close stacking of the TXES elements (not shown).

Alternatively, lifting points may be cast into the TXES elements in ways where the higher local stresses of the lifting loads are spread into the TXES element over sufficient area to maintain acceptable levels of load across the TXES element. Generally, the lifting features are cast so as to not protrude above the normal stacking plane for the TXES element that generally will be placed above this one. Alternatively, the lifting attachment uses a feature that might protrude above that stacking plane that is removable, or a female feature is placed in the bottom of the TXES elements in general to allow the lifting protrusion feature to not interfere with tight stacking.

The matrix material of each TXES element is the material that stores the heat extracted from the exhaust gases or hot working fluids. The matrix fills voids between the heat transferring passages and working fluid tubing which improves conductivity and strength of the material.

A preferred matrix material is a concrete or concrete like matrix comprising one or more types of aggregate in a binding material (such as Portland cement). It should be noted that high matrix strength is not required, so variations of the matrix materials that produce greater thermal storage capacity (often at the cost of reduced strength) are preferred.

Conventional Portland cement-based concrete mixtures can be used in some TXES elements, subject to special curing processes in order to fully dry the matrix in order to prevent cracking when the TXES element is heated. Portland cement based concrete mixtures may require protection, either in the form of a corrosion preventative, or by lining the exhaust flues, from the acidic effects of some exhaust streams (such as sulphur rich combustion gases).

High temperature cements may be used where the TXES elements are subject to substantial heating or continued heating/cooling cycles. Mixtures of high temperature and conventional cements are also possible. Geo polymer or other materials with pozzolanic properties like fly ash can augment or replace other binder ingredients like Portland cement.

Aggregates used in the cement are selected in part due to aggregate size, as some TXES element process fluid piping and flue configurations limit the size of the aggregate that may be used. Experiments have demonstrated that the optimum maximum aggregate size that may be used is one half the inter-coil distance of any embedded coiled process fluid tubing (see below) in order to minimize any voids within the matrix. In conjunction with the aggregates, conduction enhancing additives may be added to the matrix mix. These additives may include: metal filings (metals that are compatible with concrete, like steel and not like aluminum, metal wires, in the form of a mesh, like chicken wire, which for optimum performance may be oriented generally orthogonally to the axial temperature gradient of the TXES, and/or carbon or graphite particles, fibers or filaments.

There are several approaches to integrating phase change materials into a TXES element: 1. Use tubes for the heat input fluid and the process working fluids and immerse the tubes in a container full of the phase change material. 2, Have sections of a TXES element that contain the phase change material (e.g. where the phase change material is enclosed by the concrete and/or other containment features, such as a container embedded in the matrix). In this manner, the phase change material can be located in the process where the working fluid phase change occurs (generally nearer to the colder end of the counter flow process).

Flue pathways are cast as part of each TXES element, either embedded as part of the TXES element (e.g. flue tubes) or as part of the shape of TXES element (e.g. flue channels). Flue tubes may be constructed of any piping material sufficient to withstand the heat input, for example, steel, stainless steel, ceramic, plastics, or tubing made of other specialty metals. The shape of flue pathways may be altered, in cross section (e.g. circular, oval) or in path (e.g. straight, helical) in order to achieve the desired heat transfer between the flue and the TXES element materials.

In applications where the heat supply is at low pressure there is more flexibility for the construction of flue features. Steel is a common and low cost material that is compatible with concrete-based matrix materials. Note that the shape of the flue steel passageway does not have to be round as it has little pressure on it and other shapes may package into the TXES element cross section better than others or increase the ratio of surface area per unit length of the overall TXES element or per length of working fluid tubes.

During TXES element casting, a sacrificial material can be used to form tubes and channels in the TXES element. The function of the sacrificial material is to create the cavity in the matrix during the casting process through processes known to those with skill in the art.

Additionally, corrosion resistance can be added to any of these passageway materials by coating the basic form feature with a coating. For forms that will be removed the coating is preferably placed on the outside of the form so the coating remains attached to the concrete. Examples of coatings that could be beneficial include special concrete mixtures with higher acid resistance or less porosity (for example, geopolymer based concrete), thermoplastic films with sufficient temperature resistance, a thin layer of silicone, or silica ceramic. The resistant material will face the fluid in the passageway. This liner material can be pre-made and put into the casting form of the element, particularly when the liner has sufficient strength to retain a suitable shape during the casting process. Or if the liner assembly needs support, a sacrificial or removable support can be used to suitably retain the shape during casting. These corrosion resistant or less porous coating can be applied to the form feature in a number of ways: spray coating, dip casting, slip casting and others.

Figure 5A:
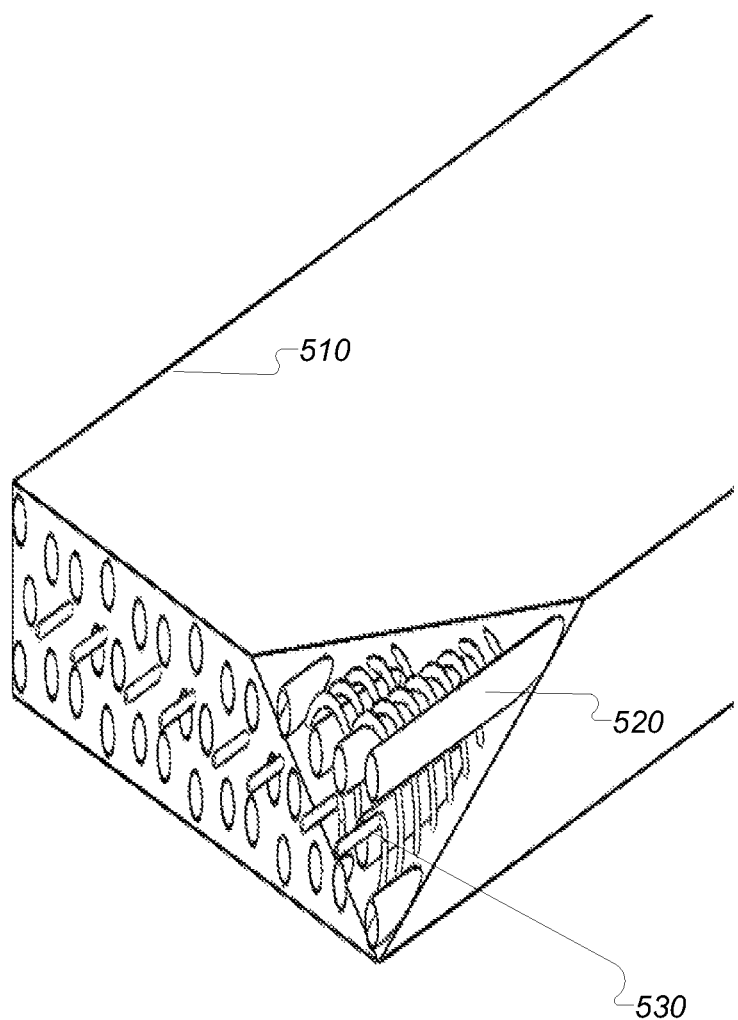
FIGS. 5a, 5b, and 5c illustrates various configuration of TXES elements with a plurality of embedded flue tubes and process fluid tubes.
Figure 5B:
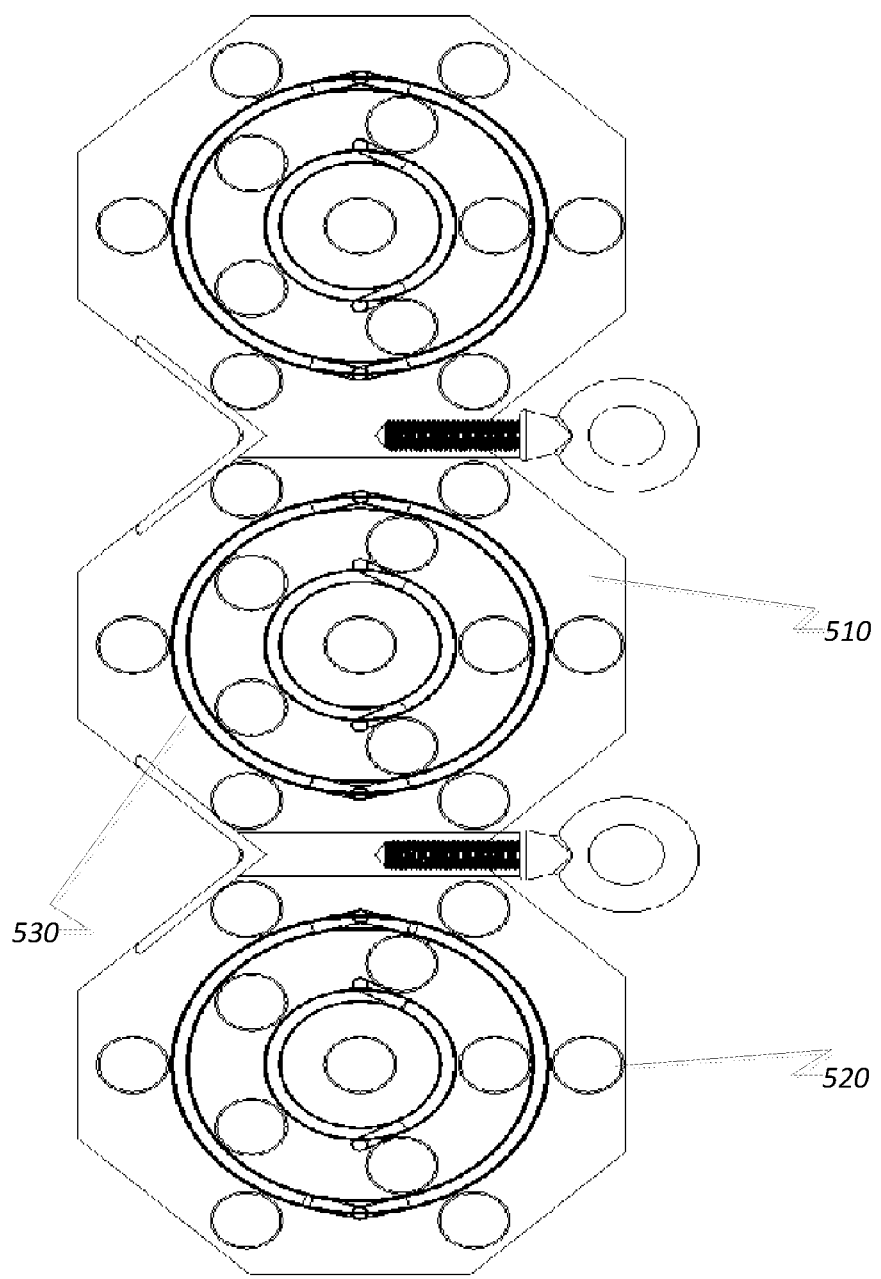
Figure 5C:
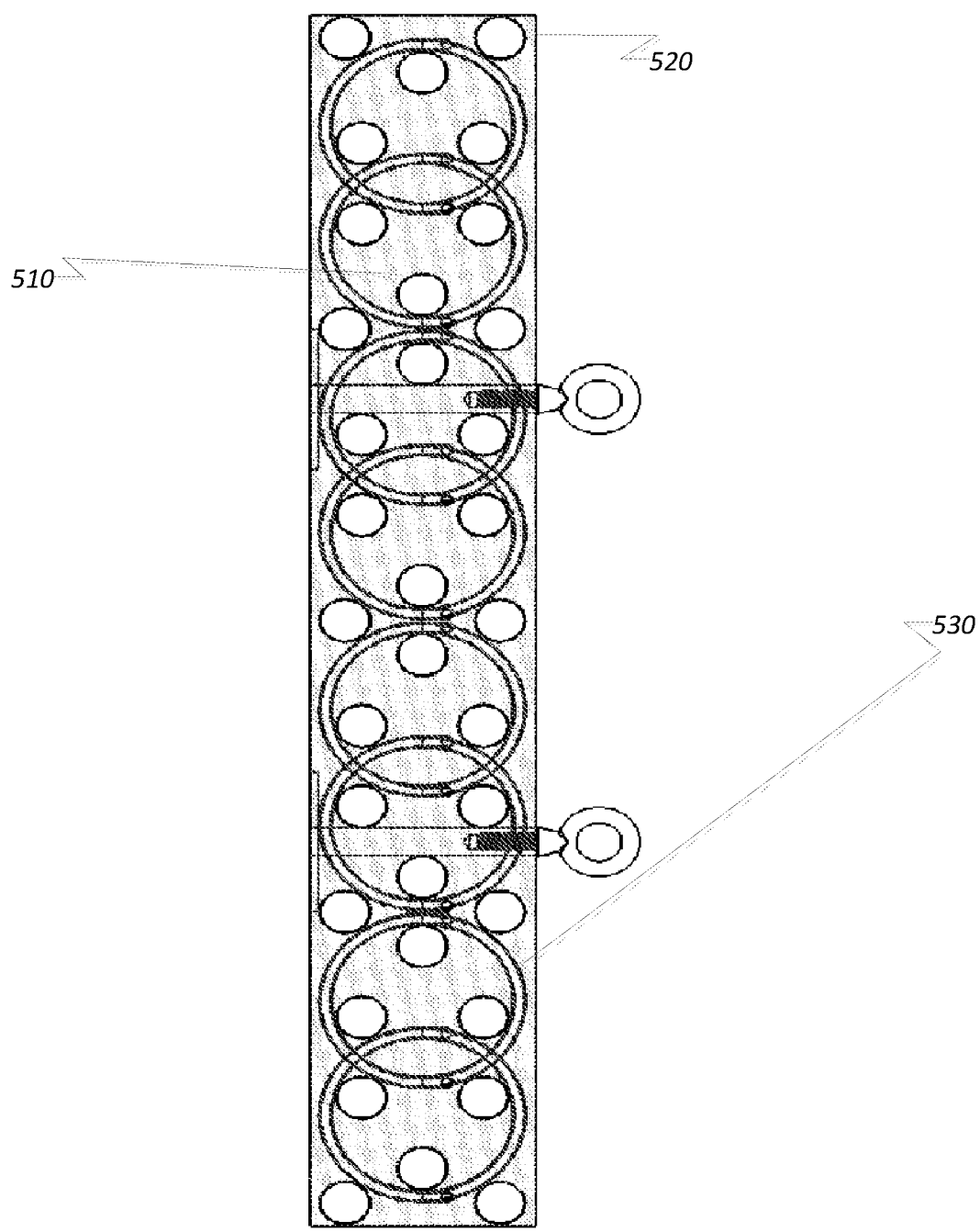

FIGS. 5a, 5b, and 5c illustrates embodiments of TXES elements with flue tubes cast into TXES element for the heat source fluid (in addition to the working fluid tubes), where heat is transferred to or from a fluid to the tube wall, where the thermal storage matrix then conducts heat away or to the tube. FIG. 5a illustrates an exemplary TXES element arrangement comprising the matrix (510), a plurality of flue tubes (520), and a plurality of helical working fluid tubes (530) embedded in the matrix. FIG. 5b illustrates a variant hexagonal TXES element (end view) with an integrated lifting attachment. FIG. 5c illustrates a rectangular TXES element (end view) with matrix, a plurality of flue tubes, and a plurality of interleaved helical working tubes with an integrated lifting attachment featuring a removable lifting ring. Other forms of lifting points may be included without deviating from the spirit of the invention. One optimization consideration is the distance between the flue tube and working fluid tubes as well as how uniformly the matrix material is dispersed with respect those convective passageways. Also, the number and arrangement of the flue tubes and helical working fluid tubes may vary without departing from the nature of the invention.

Figure 6:
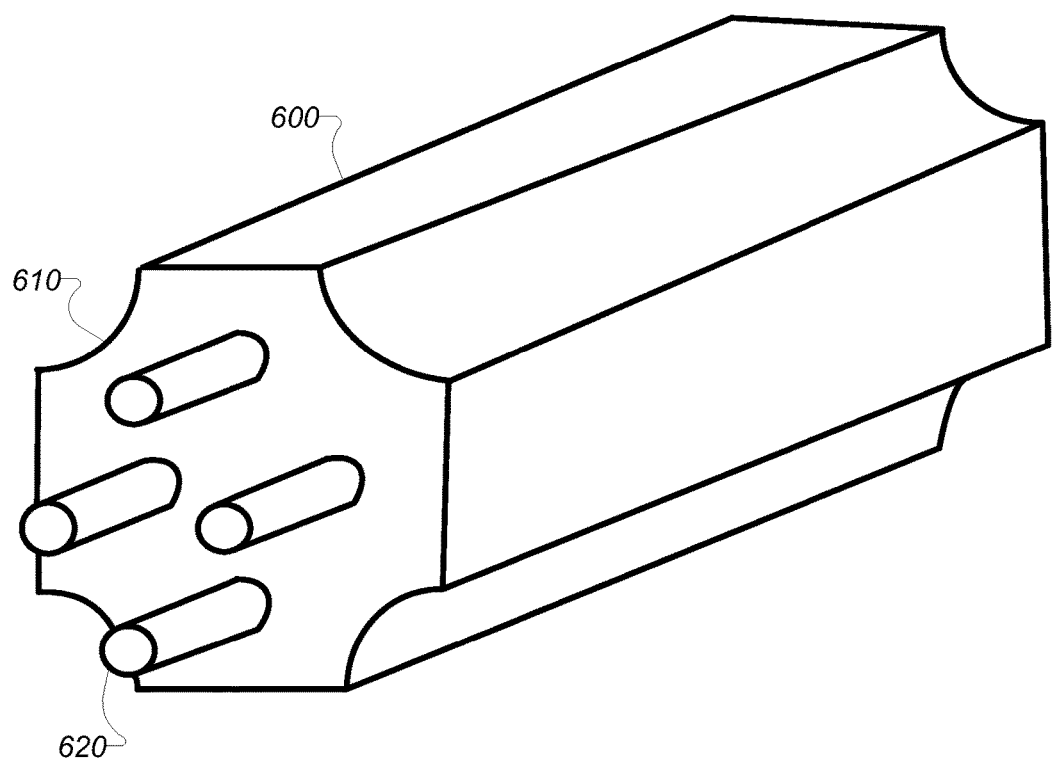
FIG. 6 illustrates an example scalloped TXES element, with cast in flue channels.

In a second exemplary embodiment, TXES elements may be formed so that the heat supply is in direct contact with the thermal storage matrix. Two such arrangements are described; many other possible configurations may be utilized without departing from the scope of the invention. FIG. 6 illustrates one exemplary embodiment when the TXES element is formed with scallops or other external features in TXES elements that have generally regular sides, (e.g. orthogonal or hexagonal) walls. In FIG. 6, the TXES element arrangement comprises the matrix (600), four cast in scallop flue channels (610), and four helical working fluid tubes (620). Other features, such as the integrated lifting points, are not shown for clarity. The number and arrangement of the scallops and helical working fluid tubes may vary without departing from the nature of the invention.

Figure 7:
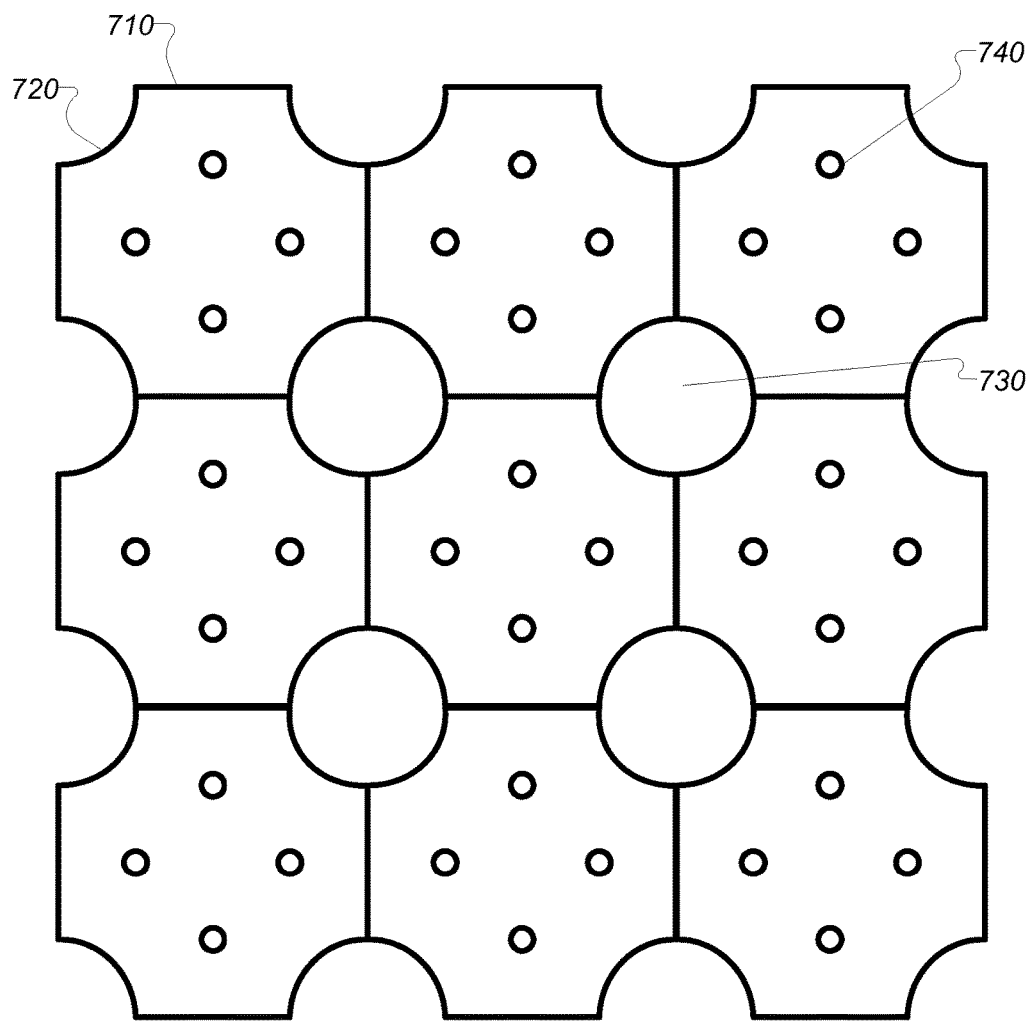
FIG. 7 illustrates an arrangement of scalloped TXES elements.

Some of the interesting features in this design include scalloping the corners away which can have at least two benefits. These are possible passageways for exhaust gas heat transfer passages and it also removes some of the concrete that is furthest away from the coils. A more uniform distance for the concrete to the coils helps minimize average concrete temperature difference (vs. the working fluid) increases which are thermodynamically less desirable. The "regular" sides allow stacking of the TXES elements while scallops provide a passageway for heated fluid from a heat source (exhaust gas, jacket coolant or even oil) to pass over these features in stack of TXES elements in a TXES array, as shown in FIG. 7. FIG. 7 illustrates nine scallop cast TXES elements (710, with scallops 720 and helical working fluid tubes 740) stacked in a 3×3 arrangement, and illustrates the exhaust passageways (730) formed by the scalloped form.

Use of process working fluid tubes embedded in the matrix of a TXES element acts at a pressure vessel for the pressurized working fluid and additionally forms a heat transfer surface. A helical or spiral coil lengthens the flow path length and increases the amount of heat transferred per TXES element. Herein, helical is used to mean any coil arrangement, including helices, spirals, or related geometry coils. The diameter of the tubing, as well as the diameter of the helical coil, its pitch (e.g. coils per meter), and the length of the tubing within each TXES element may be varied to produce a process working fluid tubing optimized for a particular working fluid, operating pressures, operating temperature range, and heat transfer coefficients TXES matrix.

A plurality of working fluid tubes may be used, as described below. The helical structured tubes have the effect of:

1. Increasing the surface area of the working fluid to the thermal mass (the surfaces of the tube itself, which vary based upon the diameter of the working fluid tube).

2. Increasing the path length over which the heat transfer can occur. Because the goal of the working fluid process is to get nearly all of the heat out of the fluid during a mechanical charging process or to vaporize and then superheat the fluid up to near the full temperature of the hot end of the storage material, small temperature differences between the heat storage material and working fluid are desired. However, small temperature differences between the working fluid and solid storage material result in low heat transfer rates and thus a longer distance and more surface area is needed to achieve the complete heat transfer to or from the working fluid.

3. Longer available length means that the heat transfer flux ($W/m^2$) can be lower and this minimizes the systemic efficiency loss due to higher temperature differences between the working fluid and the storage material (e.g. the concrete). Lower heat fluxes means beneficially lower temperature gradient in the heat storage material.

4. Increase the total length of the heat transfer function when factoring in that the heat transition process is physically moving inside the TXES as the TXES heats or cools. So it is desirable that the length of the heat transfer zone is relatively short vs. the overall available length because the majority of the high quality heat storage is in the hot end of the store on the hot side of the heat transfer zone.

5. Exposing more of the TXES element matrix available for heat storage.

Each of these factors may be considered when calculating a thermal transfer coefficient for a fluid pathway within a TXES element. A thermal transfer coefficient is a metric that describes the overall capability of the pathway to transfer heat between the TSEX element matrix and a working fluid. Thermal transfer coefficients and their use in determining optimal fluid path lengths are described below.

The flexibly defined working and source fluid paths in the TXES array permit the selection (and creation) of fluid pathways with differing thermal transfer coefficients. Each passageway through a TXES element has a defined thermal transfer coefficient, based upon the current temperature and temperature gradient in the TXES element, the working fluid, its temperature and pressure, and characteristics of the passageway (length, diameter (e.g. the transfer area), material). The thermal transfer coefficients as a function of working fluid characteristics for each passageway in a TXES element may be computed and/or measured prior to the TXES element being deployed in a TXES array, and these coefficients may be stored in a memory of the process controller. Note that the thermal transfer coefficient is independent of the absolute temperature and pressures involved. It provides a metric by which the amount of heat that is added to (subtracted from) the working fluid as it passes through a TXES element.

For example, a first passageway comprising a straight tube through a TXES element for a specific working fluid, flow rate, and temperature (as determined by sensors in the working fluid pathway), and a known temperature and temperature gradient arrangement within the TXES element (as determined by temperature sensors in the TXES element), may be determined to have an thermal transfer coefficient of 1, whilst a first helical coil of radius six inches, and a pitch between coils of 4 inches, may have an thermal transfer coefficient of 100, and a second helical coil of radius twelve inches, and a pitch between coils of 4 inches, may have an thermal transfer coefficient of 200. Thus, a first working fluid passing through each of these fluid passageways will acquire 1, 100, or 200 units of energy transferred into (or out of) the working fluid for a specific heat configuration of a TXES element. For a different heat configuration of the TXES element, the same working fluid conditions may acquire 0.5, 50, or 100 units of energy when flowing through a specific passageway in the TXES element. A different working fluid under the same TXES element conditions may have a thermal transfer coefficient of 2, 50, and 100 for the three pathways respectively. Again, this information may be encoded and stored within a memory of the process controller.

When a fluid pathway passes through more than one TXES array and/or TXES elements, the totaled thermal transfer coefficient is the sum of the respective coefficients of the TXES elements/passageway coefficients through which the fluid traveled.

Figure 8:
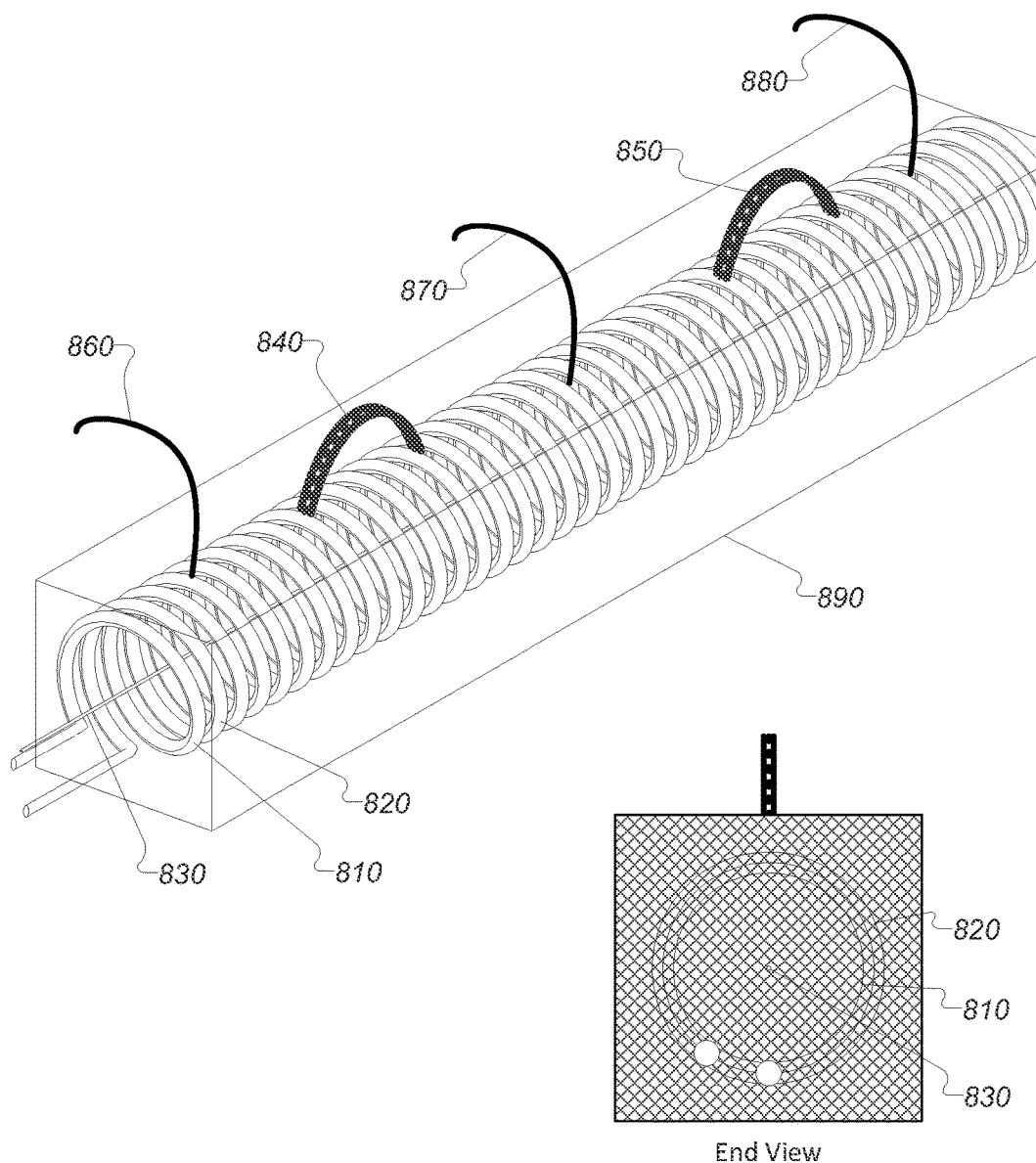
FIGS. 8, 9, 10, and 11 illustrate different helical working fluid tube arrangements within TXES elements.

FIG. 8 illustrates a coaxial arrangement of similarly sized and pitch helical process fluid tubes embedded in a TXES element. Two helical process tubes (810, 820) are arranged around a common axis (830), with the coils of the helix are intertwined in order to provide equal contact area with the heated TXES element matrix (890). Note that the flue tubes in the TXES element are omitted from the drawing for clarity. Embedded temperature and pressure sensors (860, 870, 880) are used to detect the temperature of the TXES element (and optionally the pressure of the working fluid in one or more of the helical process fluids tubes). Integrated lifting elements (840, 850) are also illustrated.

Figure 9:
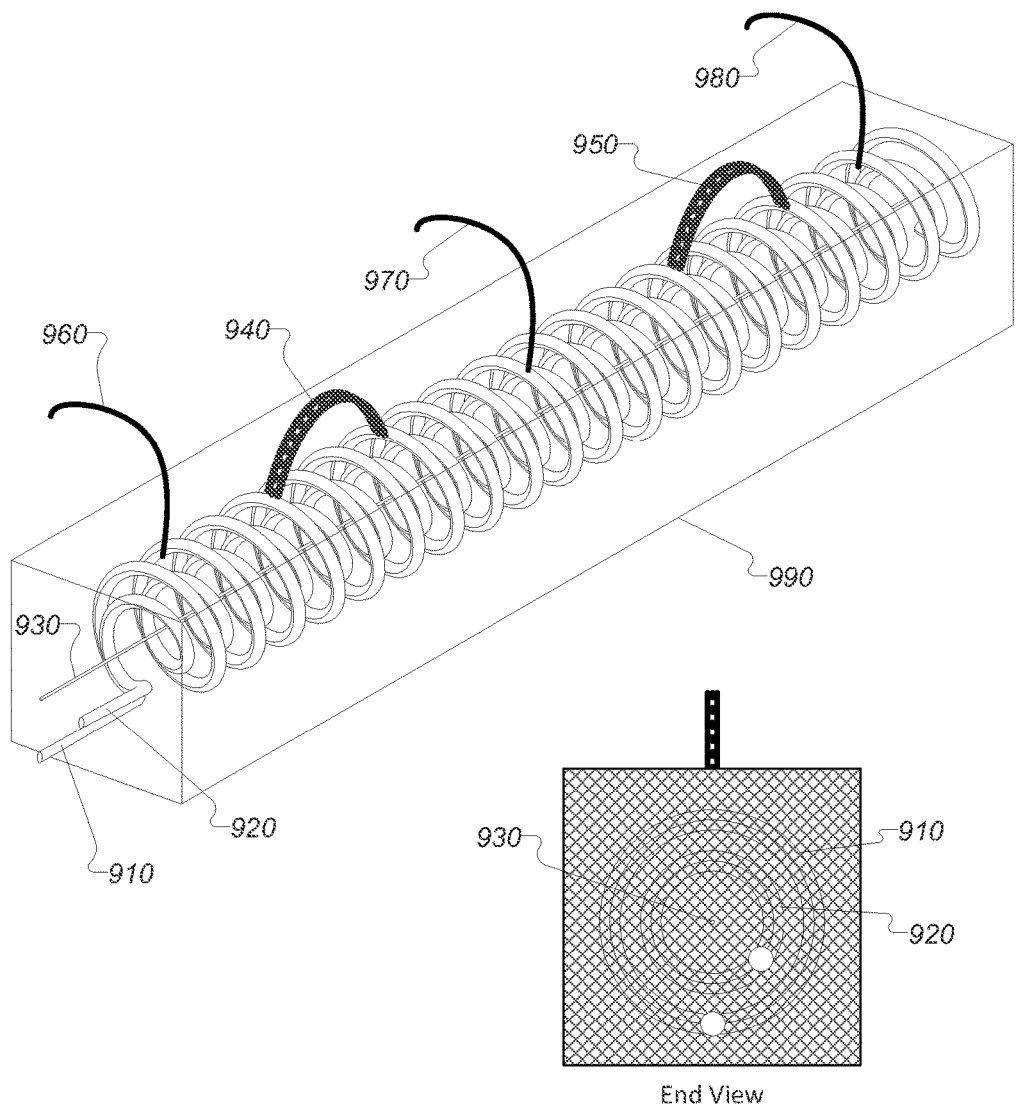

FIG. 9 illustrates a second coaxial arrangement of different size and pitch helical process fluid tubes (910, 920) embedded in a TXES element, arranged around a common axis (930). Note that the flue tubes in the TXES element are omitted from the drawing for clarity. Embedded sensors (960, 970, 980) and integrated lifting points (940, 950) are also shown. The process fluid tube coils are nested, providing a first tube with more surface area and tube length, and a second tube with less surface area and tube length. These tubes thus provide differing amounts of heat exchange between the TXES element and the process fluid in the tube, and would each have differing thermal transfer coefficients. Thus, a process fluid flow may be selected through the TXES element using a tube that has a long fluid path (and thus, more heat exchange and a higher thermal transfer coefficient) or a shorter fluid path in a different tube (and thus less heat exchange and a lower thermal transfer coefficient) depending upon the temperature of the TXES element and the amount of process fluid heating desired. In other uses, one tube with a first working fluid may be selected for use if the TXES element is hot, while the second tube may be selected if the TXES element is cooler in order to control the amount of heat extracted from the TXES element when operating with multiple fluid heat engine processes. Alternatively, different working fluids may be routed through the different tubes, further enhancing the management of the heat stored in the TXES element.

Figure 10:
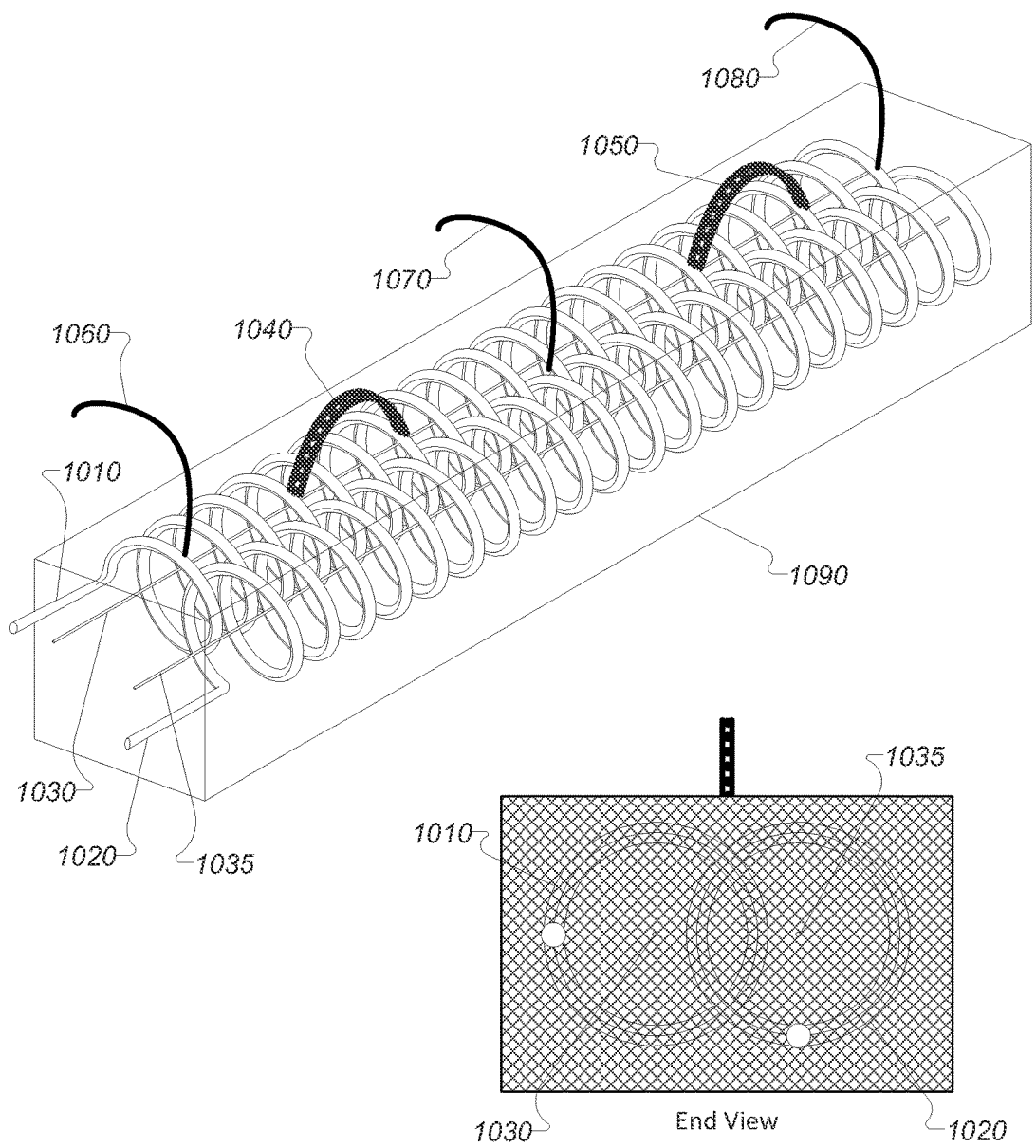

FIG. 10 illustrates a co-linear (i.e. the axes of the helical process tubes are parallel) arrangement of similarly sized and pitch helical process fluid tubes (1010, 1020) embedded in a TXES element (1090) with co-linear but not co-axial axis (1030/1035). Note that the flue tubes in the TXES element are omitted from the drawing for clarity. Integrated sensors (1060, 1070, 1080) and lifting attachments (1040, 1050) are also shown. The coils of each working fluid tube helix are intertwined in order to provide a large contact area with the matrix material. Also note that in this embodiment the helices are not on the same axis, which has the effect of spreading the coil area exposed to the matrix (e.g., out a bit more in the left to right direction vs. a coaxial alignment). Spreading the coils out horizontally is a strategy to make uniform heat transfer surface area in a linear pattern vs. a more concentric pattern. Corners, those sections relatively far away from the often helical tubing are preferred to be avoided as the thermal delay or lag in those relatively distant sections can decrease performance. Concentric patterns like FIG. 8 and FIG. 9 can trim away the corners (not shown) or the design in FIG. 5b creates a repeating pattern that minimized the number of corners per TXES element.

Figure 11:
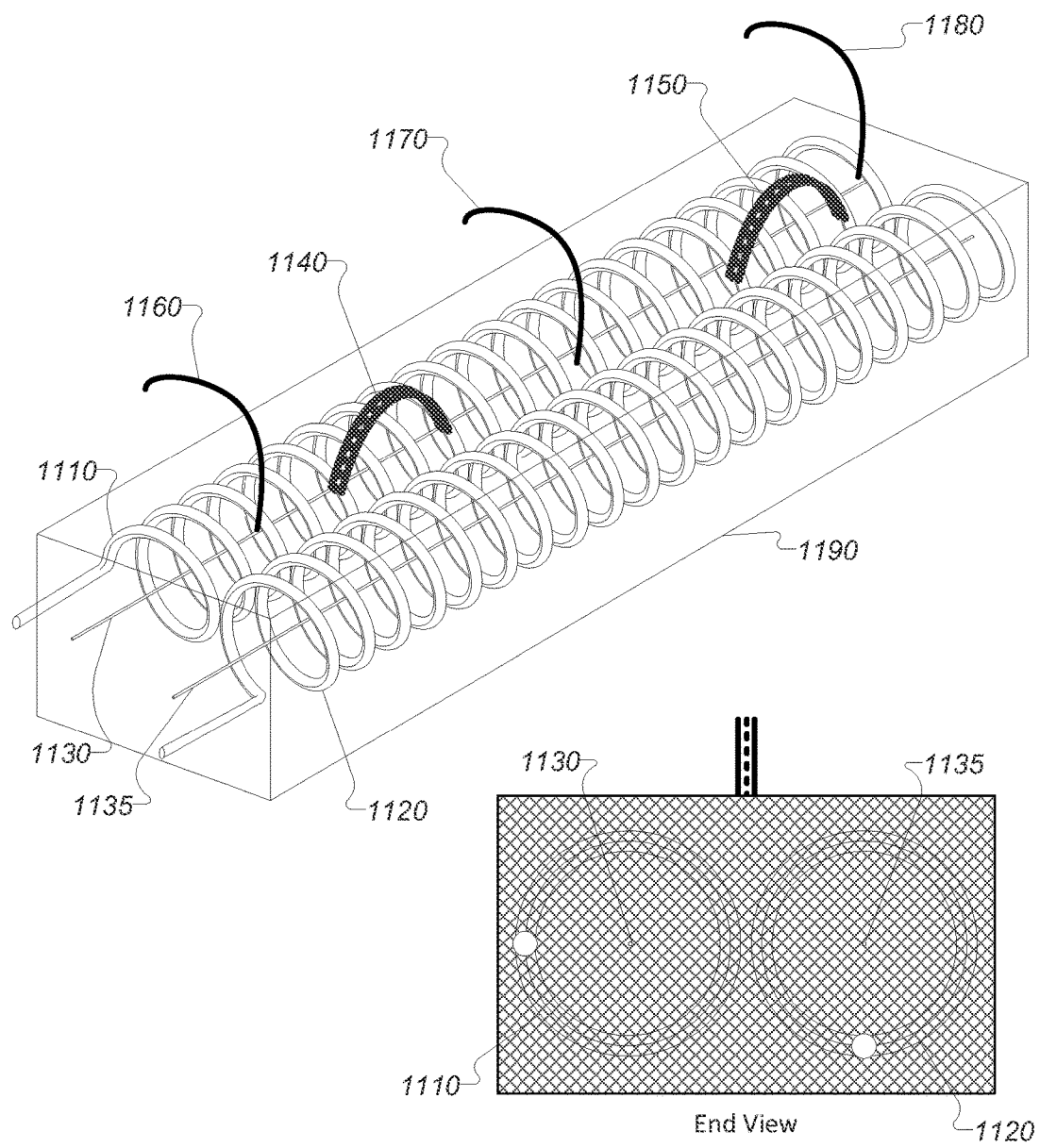

FIG. 11 illustrates a non-overlapping, co-linear arrangement of helical process fluid tubes (1110, 1120) embedded in a TXES element (1190). Note that the flue tubes in the TXES element are omitted from the drawing for clarity. Integrated sensors (1160, 1170, 1180) and lifting attachments (1140, 1150) are also shown. The process fluid tubes may be of differing sizes and coil pitches in order to provide differing amounts of heat transfer for each tube path.

Each of the above examples illustrates a TXES element with two helical working fluid tube elements, with a varying tube characteristics and coil characteristics. The number of helical working fluid tubes, axis offsets, and amount of coil interleaving present in a TXES element may be varied without departing from the scope and intent of the invention, with the caveat that the TXES element aggregate size must be decreased as the number of tubes are increased so as to minimize voids in the TXES element matrix during casting.

Often there will be a common pattern at the core of the working fluid tubing, heat supply passageways and perhaps other features, like scalloping or notching, that can be repeated, but generally cast into assembles of many of these common subset patterns. Cost saving or other values can often occur when aggregating many similar features into a larger casting include—less labor per feature when casting many features together, reducing the time of handling the assemblies during the manufacturing process as well as during project site installation, stiffer sections for lifting operations when the cast element is thicker—reducing internal reinforcements, allowing more of the manifolding outside of the TXES element to be completed in a more controlled and cheaper factory operation vs. field assembly, aligning more of the pressurized fluid tubing precisely with the forming tools, versus the higher variations when stacking separate TXES elements.

Figure 12:
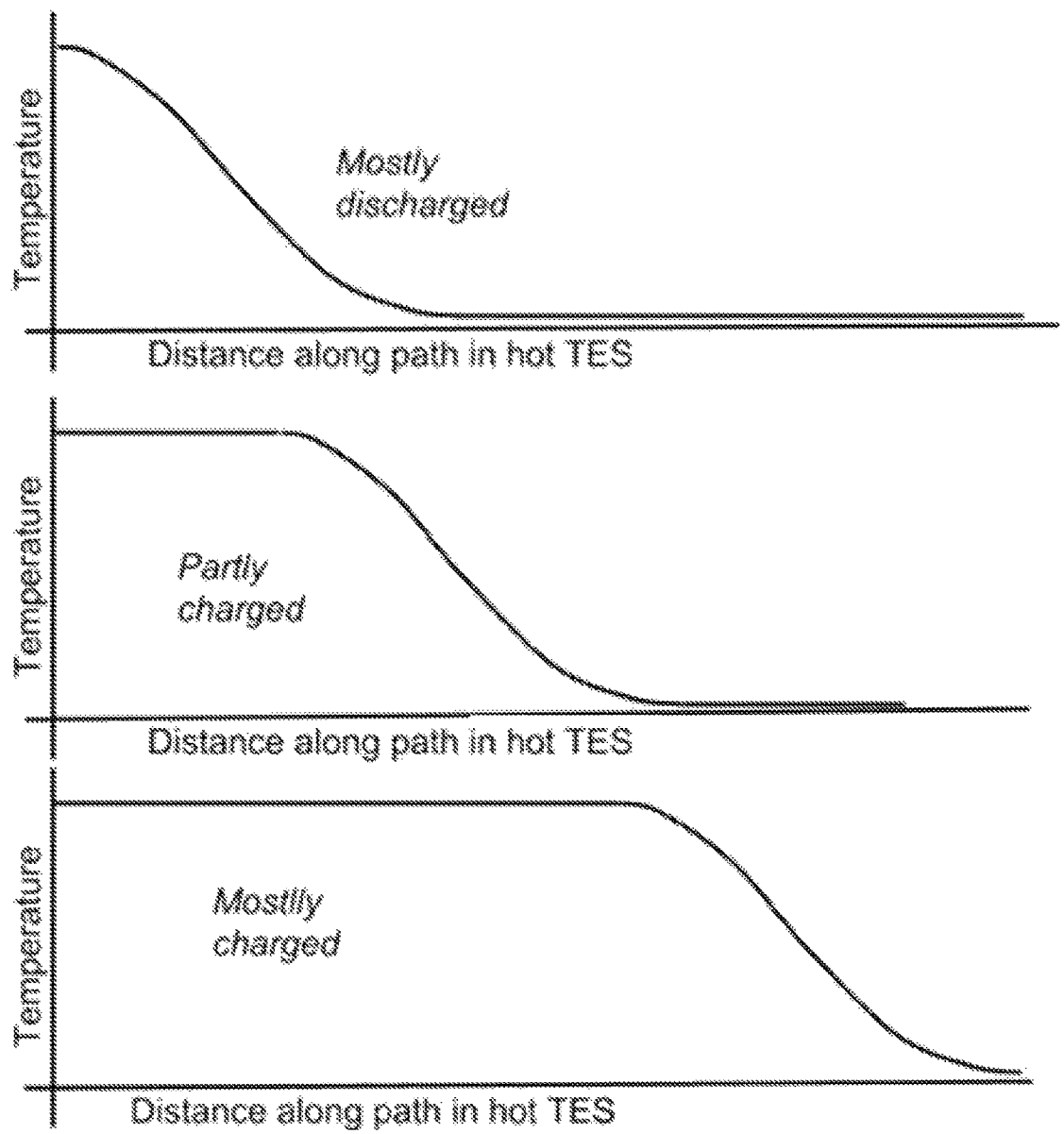
FIG. 12 comprises example heating curves for a TXES element in its various states.

As mentioned above, the system preferably operates in counter flow, where the heat source fluid flows in one direction, heating the TXES elements starting at the "hot" end and exiting at the "cool" end, and the working fluid flows in an opposite (or counter flow) direction, entering at the cool end and exiting at the "hot" end. During charge (e.g. adding heat energy to the TXES element), this has the effect of increasing the slope of the temperature gradient within the TXES element(s). The heat gradient zone, which is the portion of the TXES element where heat transfer primarily occurs, also moves linearly within the TXES element as the amount of heat charge changes. Counter-flow increases the efficiency and cost effectiveness of the system by steepening the temperature gradient along a TXES element as the TXES element temperature profile moves between charged and discharged states. FIG. 12 illustrates three graphed examples of the charge state of a TXES element in various stages of heat charge.

The process controller monitors the temperature and pressure of the incoming heat source, the working fluid(s), and for each of the TXES elements comprising a TXES array, and adjusts the fluid paths and flows to optimize the amount of heat retained during charging, stored in a charged state, and rejected into a working fluid during discharge.

A benefit of the TXES array, when combined with the modular design of TXES elements and the process controlled flow management of the system, is that heat and working fluid flows may be optimized through the system in order to capture, store, and extract and use a maximum amount of heat from the input heat stream. The same mechanisms (the TXES elements used may be adjusted for heat and working fluids) may be used when the system is attached to the output of a cement plant, a power plant, or an industrial waste heat recapture process.

It will also be recognized by those skilled in the art that, while the invention has been described above in terms of preferred embodiments, it is not limited thereto. Various features and aspects of the above described invention may be used individually or jointly. Further, although the invention has been described in the context of its implementation in a particular environment, and for particular applications, those skilled in the art will recognize that its usefulness is not limited thereto and that the present invention can be beneficially utilized in any number of environments and implementations where it is desirable. Accordingly, the claims set forth below should be construed in view of the full breadth and spirit of the invention as disclosed herein.

What is claimed:

1. A thermal heat capture, storage, and exchange arrangement, comprising:
   at least one thermal exchange and storage (TXES) array, each of the at least one TXES arrays comprising:
      a plurality of TXES elements each configured to receive a fluid flow therethrough of each of a heat source fluid and a working fluid, with each of the plurality of TXES elements providing for a transfer of thermal energy between the heat source fluid and the TXES elements; and
      a manifold system connected to the plurality of TXES elements via piping so as to provide the working fluid to an input of the plurality of TXES elements and receive the working fluid from an output of the plurality of TXES elements;
   at least one heat engine operable with the at least one TXES array to extract heat from the at least one TXES array and convert it to mechanical energy, each of the at least one heat engines being selectively connected to the manifold system of a respective TXES array to pass the working fluid through one or more of the plurality of TXES elements of the respective TXES array, such that a transfer of thermal energy between the working fluid and the one or more respective TXES elements occurs;
   a valve system included in the piping connecting the manifold system and the plurality of TXES elements to control a mass flow of the working fluid through the plurality of TXES elements of the at least one TXES array;
   a plurality of sensors arranged in the thermal heat capture, storage, and exchange arrangement to acquire at least one of temperature and pressure readings from one or more of the heat source fluid, the plurality of TXES elements, and the working fluid; and
   a process controller configured to:
      identify optimal operating parameters of each heat engine of the at least one heat engine;
      receive the at least one of the temperature and pressure readings from the plurality of sensors; and
      control, based on the identified optimal operating parameters of each heat engine and the received at least one of the temperature and pressure readings, operation of the valve system to fluidly connect a desired heat engine of the at least one heat engine to one or more optimal TXES elements of the at least one TXES array to pass the working fluid from the desired heat engine therethrough to extract heat;
   wherein the plurality of TXES elements comprises TXES elements having differing thermal exchange and thermal storage characteristics, such that the thermal exchange and thermal storage characteristics of at least one TXES element are different than the thermal exchange and thermal storage characteristics of at least one other TXES element.

2. The arrangement of claim 1 further comprising a process controller configured to:
   selectively control a flow of the heat source fluid to each of the at least one TXES arrays and to the plurality of TXES elements of each respective TXES array; and
   selectively control a flow of the working fluid of each respective heat engine to each of the at least one TXES arrays and to the plurality of TXES elements of each respective TXES array.

3. The arrangement of claim 1 where each of the plurality of TXES elements comprises:
   a matrix material substrate;
   one or more flue tubes or passageways formed or positioned in the matrix material substrate and configured to receive the heated source fluid therein; and
   one or more working fluid tubes positioned in the matrix material substrate separate from the one or more flue tubes or passageways, the one or more working fluid tubes configured to receive the working fluid therein from the heat engine;
   wherein the transfer of thermal energy between the heated source fluid and the working fluid occurs via the matrix material substrate.

4. The arrangement of claim 3 wherein the matrix material substrates comprises one of a mixture of cement binder and aggregate and a mixture of a binder and a phase change material.

5. The arrangement of claim 4 wherein one or more of the working fluid tubes comprises a helical-shaped tube provided in the matrix material.

6. The arrangement of claim 3 wherein the one or more working fluid tubes comprises at least a first helical-shaped working fluid tube and a second helical-shaped working fluid tube, with the first helical-shaped working fluid tube and the second helical-shaped working fluid tube being arranged in one of a intertwined arrangement, a nested arrangement, a co-linear and non- co-axial arrangement, or a co-linear and non-overlapping arrangement.

7. The arrangement of claim 3 wherein the matrix material substrate is formed into a block-shaped element, with a scallop formed at each of corners of the block-shaped element; and
   wherein scallops of the block-shaped elements of a plurality of adjacent TXES elements in a respective TXES array collectively form a passageway to receive the heated source fluid therein.

8. The arrangement of claim 1 wherein the at least one TXES array comprises a plurality of TXES arrays and the at least one heat engine comprises a plurality of heat engines including a first heat engine and a second heat engine.

9. The arrangement of claim 8 where the first heat engine has differing characteristics from the second heat engine, the differing characteristics comprising at least one of a engine process, maximum pressure operating limit, and an available flow rate.

10. The arrangement of claim 8 where the working fluid of the first heat engine is different from the working fluid of the second heat engine.

11. The arrangement of claim 1 wherein the at least one heat engine is further operable to provide thermal energy to the at least one TXES array via the working fluid.

12. A thermal heat capture, storage, and exchange arrangement, comprising:
at least one modular thermal exchange and storage (TXES) array, each of the at least one modular TXES arrays comprising one or more TXES elements that each includes:
a matrix material substrate;
one or more flue tubes or passageways formed or positioned in the matrix material substrate to provide for a flow of a heated source fluid through the TXES element, the heated source fluid provided from a heat source; and
one or more working fluid tubes positioned in the matrix material substrate separate from the one or more flue tubes or passageways to provide for a flow of a working fluid through the TXES element;
one or more heat engines operable with the at least one TXES array to extract heat from the at least one TXES array and convert it to mechanical energy, the one or more heat engines providing the working fluid to the at least one modular TXES array;
a valve system positioned in piping and ducting connecting the heat source to the at least one modular TXES array and connecting the one or more heat engines to the at least one modular TXES array, the valve system selectively controlling the flow of the heated source fluid to the at least one modular TXES array and the one or more TXES elements thereof and selectively controlling the flow of the working fluid to the at least one modular TXES array and the one or more TXES elements thereof;
a plurality of sensors arranged in the thermal heat capture, storage, and exchange arrangement to acquire at least one of temperature and pressure readings from one or more of the heated source fluid, the one or more TXES elements, and the working fluid; and
a process controller configured to:
receive the at least one of the temperature and pressure readings from the plurality of sensors; and
control, based on the received at least one of the temperature and pressure readings, operation of the valve system to adjust fluid paths and flows of the heat source fluid and the working fluid, such that a maximum amount of heat from the heated source fluid is transferred to the thermal heat capture, storage, and exchange arrangement;
wherein the plurality of sensors comprise temperature sensors embedded within and/or mounted on each of the one or more TXES elements to measure a thermal profile and temperature gradient within each of the one or more TXES elements; and
wherein the process controller controls operation of the valve system also based on the thermal profile and temperature gradient of the one or more TXES elements.

13. The arrangement of claim 12 wherein the at least one modular TXES array comprises a plurality of modular TXES arrays including at least a first modular TXES array and a second modular TXES array, the first and second modular TXES arrays being arranged in series such that the first modular TXES array receives the heated source fluid at a first temperature and the second modular TXES array receives the heated source fluid at a second temperature.

14. The arrangement of claim 13 wherein the one or more heat engines comprises a first heat engine and a second heat engine, with the first and second heat engines having differing operational characteristics or different working fluids therein.

15. The arrangement of claim 14 wherein the first heat engine is fluidly connected to the first modular TXES array to provide working fluid thereto and the second heat engine is fluidly connected to the second modular TXES array to provide working fluid thereto, with the first heat engine having operational characteristics or a working fluid suitable for use with the first modular TXES array that receives heated source fluid at the first temperature and the second heat engine having operational characteristics or a working fluid suitable for use with the second modular TXES array that receives heated source fluid at the second temperature.

16. The arrangement of claim 12 wherein the one or more flue tubes or passageways and the one or more working fluid tubes in a respective TXES element are arranged so that the heated source fluid flows through the TXES element from a hot end to a cold end thereof and the working fluid flows through the TXES element either from the cold end to the hot end when enthalpy is being added to the working fluid or from the hot end to the cold end when the working fluid is giving up enthalpy.

17. The arrangement of claim 12 wherein each of the one or more working fluid tubes in a respective TXES element comprises a helical-shaped tube.

18. The arrangement of claim 1 wherein the process controller is configured to control operation of the valve system to fluidly connect a desired heat engine to one or more optimal TXES elements based on the thermal exchange and thermal storage characteristics of each of the plurality of TXES elements.

* * * * *